United States Patent
Takayama et al.

(10) Patent No.: US 6,195,007 B1
(45) Date of Patent: Feb. 27, 2001

(54) RECORDING MEDIUM HANDLING APPARATUS

(75) Inventors: Yoshihisa Takayama; Susumu Kusakabe, both of Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/389,617

(22) Filed: Sep. 3, 1999

(30) Foreign Application Priority Data

Sep. 4, 1998 (JP) .................................................. 10-251004

(51) Int. Cl.⁷ .................................................. G08B 13/14
(52) U.S. Cl. ..................... 340/572.1; 340/572.7; 340/825.34; 340/825.49; 235/381; 235/375; 235/439; 235/451; 700/218; 369/34; 369/35; 369/36; 343/966
(58) Field of Search ............................. 340/572.7, 572.1, 340/825.34, 825.3, 825.35, 825.49; 343/866; 235/450, 462.01, 449, 381, 376, 439, 487, 375, 451; 700/218; 312/9.31, 9.3; 711/114, 111; 414/281, 744.3; 369/35, 37, 36, 34; 194/205

(56) References Cited

U.S. PATENT DOCUMENTS

| | | | |
|---|---|---|---|
| 4,527,262 | * | 7/1985 | Manto ..................................... 369/33 |
| 4,815,055 | * | 3/1989 | Fago, Jr. ................................. 369/36 |
| 4,827,110 | * | 5/1989 | Rossi et al. ............................ 235/376 |
| 4,839,875 | * | 6/1989 | Kuriyama et al. ..................... 369/14 |
| 4,860,876 | * | 8/1989 | Moore et al. .......................... 194/205 |
| 4,928,245 | * | 5/1990 | Moy et al. ............................. 700/218 |
| 5,028,766 | * | 7/1991 | Shah ..................................... 235/381 |
| 5,143,193 | * | 9/1992 | Geraci ................................... 194/212 |
| 5,340,968 | * | 8/1994 | Watanabe et al. .................... 235/380 |
| 5,377,121 | * | 12/1994 | Dimitri et al. ........................ 700/218 |
| 5,416,914 | * | 5/1995 | Korngiebel et al. ................. 711/114 |
| 5,454,681 | * | 10/1995 | Baur ..................................... 414/281 |
| 5,456,569 | * | 10/1995 | Cheatham et al. ................. 414/744.3 |
| 5,528,566 | * | 6/1996 | McGee et al. ......................... 369/37 |
| 5,567,927 | * | 10/1996 | Kahn et al. ...................... 235/462.01 |
| 5,971,281 | * | 10/1999 | Frary et al. ........................... 235/487 |

* cited by examiner

Primary Examiner—Benjamin C. Lee
(74) Attorney, Agent, or Firm—Jay H. Maioli

(57) ABSTRACT

A recording medium handling apparatus, such as a library apparatus, is designed to be able to carry out excellent information communication with a specific recording medium having a noncontact type memory. The recording medium handling apparatus includes a magazine for housing a plurality of tape cassettes arranged side by side, and an interface circuit capable of executing data transmission with respect to the memory in the tape cassette in a noncontact manner by executing wireless communication with a remote memory chip in the tape cassette through an antenna. The shape and the size of the antenna are set according to an interval of the tape cassettes such that when the antenna is put in a positional state where the antenna confronts an objective tape cassette having a memory with which communication is to be executed, among the plurality of tape cassettes arranged in the magazine so that communication becomes possible, a memory of a tape cassette arranged adjacently to the objective tape cassette is located at a position corresponding to a dead zone of the antenna.

3 Claims, 18 Drawing Sheets

FIG.10

CONTENTS OF A NON-VOLATILE MEMORY OF A REMOTE MEMORY CHIP (1) MEMORY FORMAT
(2) CONTROL FLAG
(3) IDENTIFIER OF MANUFACTURE (1 BYTE) ⎫
(4) SECOND IDENTIFIER (1 BYTE) ⎬ DATA FOR AUTHENTICATION
(5) SERIAL NUMBER (32 BYTE) ⎪
(6) CRC CODE OF SERIAL NUMBER (2 BYTE) ⎭
(7) DATE OF MEMORY MANUFACTURE
(8) NAME OF MEMORY MANUFACTURE LINE
(9) NAME OF MEMORY MANUFACTURE FACTORY
(10) NAME OF MEMORY MANUFACTURE
(11) TYPE NAME OF MEMORY
(12) NAME OF CASSETTE MANUFACTURE LINE
(13) DATE OF CASSETTE MANUFACTURE
(14) NAME OF CASSETTE MANUFACTURE FACTORY
(15) NAME OF CASSETTE MANUFACTURE
(16) NAME OF CASSETTE
(17) NAME OF OEM CUSTOMER
(18) INFORMATION OF TAPE CHARACTERISTIC SPECIFICATION
(19) MAXIMUM COMMUNICATION SPEED
(20) BLOCK SIZE
(21) MEMORY CAPACITY
(22) START ADDRESS OF READ ONLY REGION
(23) END ADDRESS OF READ ONLY REGION
(24) VARIOUS POINTERS
(25) MEMORY MANAGEMENT INFORMATION
(26) VOLUME ATTRIBUTE
(27) VOLUME INFORMATION
(28) VOLUME USE HISTORY INFORMATION
(29) HIGH SPEED SEARCH SUPPORT MAP INFORMATION
(30) UNLOAD POSITION INFORMATION
(31) USER FREE REGION
(32) RESERVED REGION
- - - - - - - - - - - - - - - - - - - - - - - - - - - - - - -
(33) SESSION IDENTIFIER (1BYTE)

RECORDING MEDIUM HANDLING APPARATUS

BACKGROUND OF THE INVENTION

1. Field of the Invention

The present invention relates to an apparatus handling a recording medium such as a tape cassette used for, for example, data storage, and particularly to an apparatus handling a recording medium provided with a noncontact type memory in its inside.

2. Description of the Related Art

As a driving apparatus capable of recording/reproducing digital data on a magnetic tape, a so-called tape streaming drive is known. Such a tape streaming drive can have huge recording capacity, depending on a length of a tape cassette as a medium, of, for example, several tens to several hundreds of giga bytes. Thus, the tape streaming drive is widely used for, for example, backup of data recorded in a medium such as a hard disk of a computer main body. Besides, the tape streaming drive is suitable also for the case where it is used for storage of image data, etc. of large data size.

As the foregoing tape streaming drive, there is proposed such a tape streaming drive that a tape cassette of 8 mm VTR is used as a recording medium, and recording/reproduction of data is carried out by adopting a helical scan system with a rotary head.

In such a magnetic tape cassette, since only the tape medium is a medium for recording data, data (various data other than main data of storage object) such as data for control and data for system setting are also recorded on the tape.

However, in actual use, there are many cases where it is desired to read data of a tape cassette in a state where the tape cassette is not loaded.

For example, in a library apparatus (changer apparatus) in which a number of tape cassettes are housed in a magazine form and are selectively supplied to a tape streaming drive, it is preferable that some data can be read out from a cassette outer case for the purpose of identifying a cassette to be conveyed.

For this purpose, it has been considered that for example, a bar code label is attached to a cassette case body, and the library apparatus reads the bar code label by an optical reader or the like, so that information (for example, the number of the cassette) for identification can be recognized.

However, the bar code can not be rewritten and an amount of information is small, so that it is unsuitable for a system executing relatively high level processing.

On the other hand, in the foregoing tape streaming system, a tape cassette in which a non-volatile memory is contained in the cassette has been developed.

This is designed such that management information of data recording/reproduction to a magnetic tape, manufacturing information of the cassette, use history information and the like are recorded in the non-volatile memory. By doing so, as compared with the case where the management information and the like are recorded on the magnetic tape, operation efficiency is extremely improved.

That is, it is demanded that these management information and the like are read and confirmed each time recording/reproduction on the magnetic tape is carried out, or are updated after the recording/reproducing operation. However, in the case where the management information and the like are recorded at a specific position (for example, a tape top) on the magnetic tape, before and after the recording/reproducing operation, the tape must be run to the specific position every time. Besides, by this, the position on the tape where the operation such as tape loading/unloading is carried out is also regulated. On the contrary, if the management information and the like are recorded in the non-volatile memory, these become unnecessary.

With respect to this non-volatile memory, the tape streaming drive is provided with a corresponding connector terminal to carry out access.

In recent years, such a tape cassette is also developed that an antenna and a wireless communication system circuit, together with a non-volatile memory, are disposed in the tape cassette (or attached to a tape cassette case body), and access to the non-volatile memory is carried out in a noncontact state. That is, a wireless communication system circuit is disposed also at the side of the tape streaming drive or library apparatus, so that recording/reproduction of data to the non-volatile memory can be carried out in the state where contact with the tape cassette is not made.

In the case where a tape cassette of such a noncontact type interface system including a non-volatile memory is considered, it is conceivable that read-out of data carried out in the bar code is carried out by using the non-volatile memory.

For example, when the library apparatus selects a specific tape cassette from a magazine housing a number of tape cassettes, intrinsic data of each tape cassette have only to be read through wireless communication.

However, there has been a problem that interference and the like from an adjacently housed tape cassette are apt to occur because of wireless communication.

If, for example, the respective tape cassettes are arranged in a state that they are apart from one another to some degree, the interference can be avoided. However, if such a method is adopted, in the library apparatus housing a number of tape cassettes, a space necessary for a storage portion becomes so wide that the apparatus structure becomes unsuitable. Thus, such a method is not preferable.

SUMMARY OF THE INVENTION

In view of these circumstances, an object of the present invention is to provide a recording medium handling apparatus, such as a library apparatus, in which excellent communication with a memory of a noncontact type interface system in a recording medium can be carried out and reading/writing can be executed.

In order to achieve the object, a recording medium handling apparatus comprises holding means for holding a plurality of recording media arranged side by side, and interface means carrying out wireless communication with communication means in the respective recording media through an antenna portion so that data transfer to memory means in the respective recording media can be carried out in a noncontact manner. The shape and the size of the antenna are set according to an arrangement interval of the recording media in the holding means such that when the antenna is put in such a positional state where communication becomes possible since the antenna confronts an objective one of the plurality of recording media arranged in the holding means, with the memory means of which communication is to be carried out, the memory means of the recording medium arranged adjacently to the objective recording medium is located at a position corresponding to a dead zone of the antenna.

That is, even in the case where the recording media are arranged with a relatively narrow interval as in the library apparatus or the like, the memory of the recording medium adjacent to the objective recording medium is positioned at the dead zone of the antenna, so that interference in relation to the memory of the adjacent recording medium in communication does not occur, and access (recording or reproduction) to only the memory of the objective recording medium can be executed.

BRIEF DESCRIPTION OF THE DRAWINGS

FIG. 10 is an explanatory view of data in the remote memory chip according to the mode.

DETAILED DESCRIPTION OF THE PREFERRED EMBODIMENTS

Figure 1:
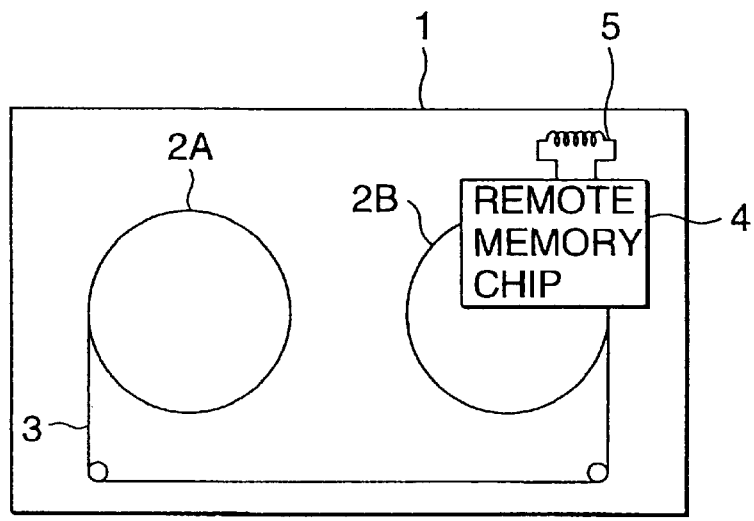
FIG. 1 is an explanatory view schematically showing an inner structure of a tape cassette according to the mode of carrying out the present invention.

Preferred embodiments of the present invention will mow be described below.

In an embodiment, a description will be made on, as an example, a data storage system comprising a tape cassette provided with a non-volatile memory, a tape drive apparatus (tape streaming drive) capable of recording/reproducing digital data to the tape cassette with the memory, a library apparatus housing a number of tape cassettes and being capable of selectively loading them into the tape streaming drive, a host computer, and the like.

The tape streaming drive and the library apparatus can execute writing/reading of information through wireless data communication with the non-volatile memory provided in the tape cassette.

The description will be made in the following sequence.
1. Structure of a tape cassette
2. Structure of a remote memory chip and data to be recorded
3. Structure of a tape streaming drive
4. Structure of a library apparatus
5. Structure of an antenna of a library apparatus 1. Structure of a Tape Cassette First, a tape cassette for a tape streaming drive and a library apparatus of this embodiment will be described with reference to FIGS. 1 to 8.

FIG. 1 schematically shows an inner structure of a tape cassette. Reels 2A and 2B are provided in the inside of the tape cassette 1 shown in this drawing, and a magnetic tape 3 with a tape width of 8 mm is wound between the reels 2A and 2B.

A remote memory chip 4 having a built-in non-volatile memory, its control circuit and the like is provided in the tape cassette 1. The remote memory chip 4 can carry out data transfer through wireless communication with a remote memory interface 30 in a tape streaming drive 10 and a library apparatus 50 described later, and an antenna 5 for this purpose is provided.

Although the details will be described later, manufacturing information and serial number information for each tape cassette, information in relation to the thickness, length and material of a tape, use history of recording data for each partition, etc., user information, and the like are recorded in the remote memory chip 4.

In the present specification, since various information stored in the remote memory chip 4 is mainly used for various kinds of management of recording/reproduction with respect to the magnetic tape 3, these are collectively referred to as "management information".

Like this, the non-volatile memory is provided in the tape cassette case body, and the management information is stored in the non-volatile memory. The tape streaming drive handling the tape cassette is provided with the interface for writing/reading to the non-volatile memory. Then reading and writing of the management information relating to data recording/reproduction to the magnetic tape are carried out to the non-volatile memory, so that the recording/reproducing operation to the magnetic tape 3 can be effectively carried out.

It is not necessary to rewind the magnetic tape to, for example, the tape top at, for example, the time of loading/unloading, that is, even at a midway position, loading and unloading can be made. Besides, editing of data can be executed by rewriting of the management information on the non-volatile memory. Further, it becomes easy to set more partitions on the tape and suitably manage them. Of course, the library apparatus and the tape streaming drive can obtain information such as various attributes of the tape cassette 1 even if read-out of the magnetic tape 3 is not carried out.

Figure 2:
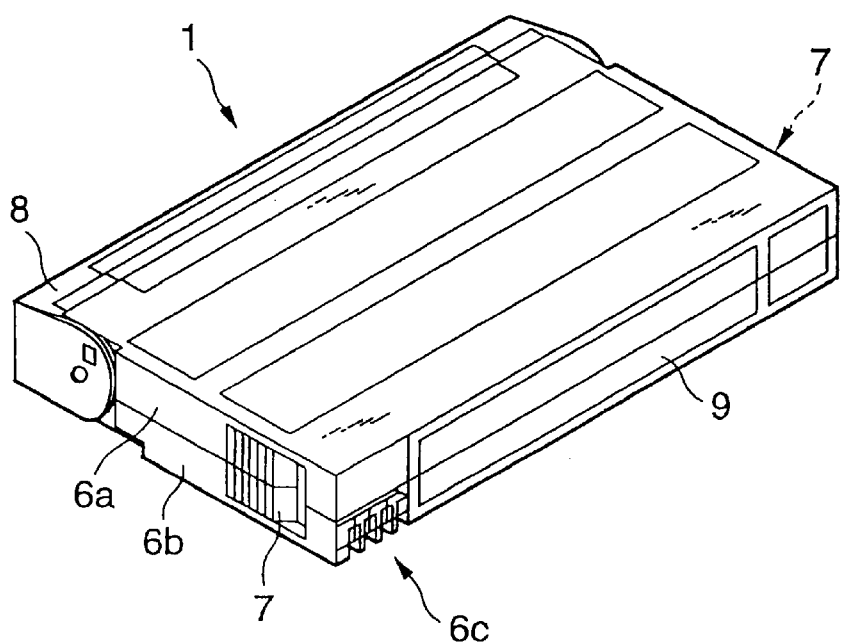
FIG. 2 is a perspective view showing an external appearance of the tape cassette according to the mode.

FIG. 2 shows an external appearance of the tape cassette 1. An entire case body is constituted by an upper case 6a, a lower case 6b, and a guard panel 8, and has basically the same structure as a tape cassette used for a normal 8 mm VTR.

Although a terminal portion 6c is provided at a label surface 9 of the side of the tape cassette 1, this is a portion where an electrode terminal is disposed in a tape cassette of a type having a built-in contact type memory which is not described in this embodiment. This portion is not used in a type having the noncontact type built-in remote memory chip 4 as in this embodiment. This portion is merely provided for keeping compatibility in tape cassette shape for apparatuses.

A recess portion 7 is formed in each of both side portions of the case body. This is a portion where the library apparatus 50 described later holds the tape cassette at the time of conveyance.

Figure 3:
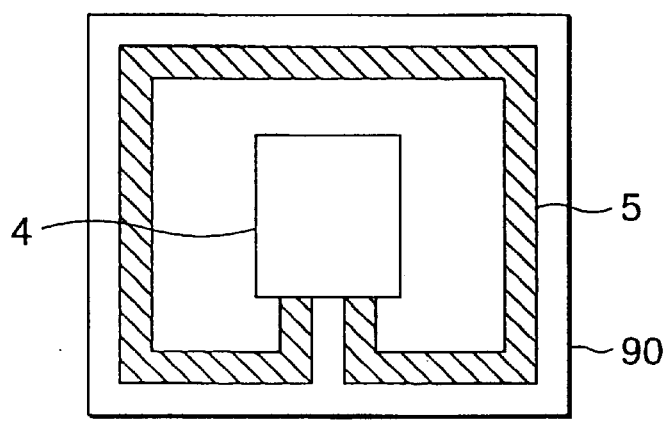
FIG. 3 is an explanatory view of a structural example of a remote memory chip of the tape cassette according to the mode.

The built-in remote memory chip and the antenna 5 are formed, for example, as shown in FIG. 3, into a module on a base substrate 90. This base substrate 90 is fixed to the inside of the case body of the tape cassette 1.

The antenna 5 is formed of copper foil or the like on the base substrate 90, and the remote memory chip 4 is mounted and is connected to the antenna 5.

The antenna 5 may be wound plural times (as a copper foil pattern, wound plural times), or may be formed at both sides of the base substrate 90 and connected with a through hole or the like. Further, such a mode may be adopted that the base substrate 90 is formed of laminated layers and the antenna 5 is sandwiched between them.

As a connection system between the antenna 5 and the remote memory chip 4, it is conceivable to adopt a system using wiring such as a wire bonding, or a system of directly connecting a pad of the remote memory chip 4 to the antenna 5 through a conductive material such as solder, not wiring.

Since the remote memory chip 4 as a silicon chip is apt to receive aging due to humidity, for the purpose of protecting the chip against humidity and other damage, it is suitable to make protection by covering the connection portion between the remote memory chip 4 and the antenna 5 with a material proof to humidity.

Figure 4:
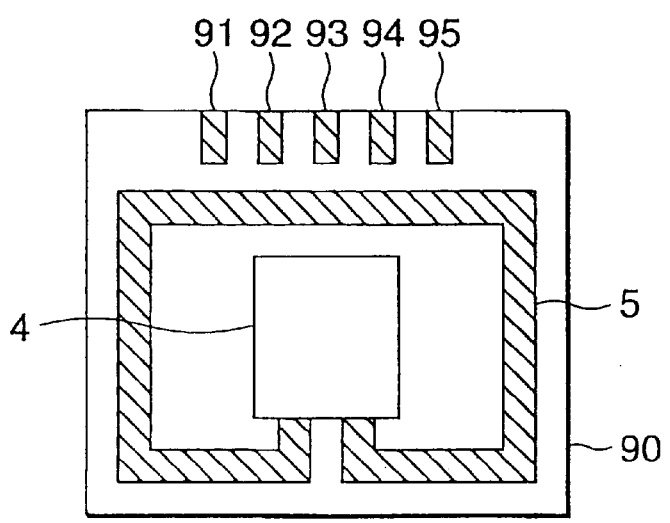
FIG. 4 is an explanatory view of another structural example of a remote memory chip of the tape cassette according to the mode.

FIG. 4 shows another example of a module disposed in the case body of the tape cassette 1. In this example, in addition to the mode of FIG. 3, in view of compatibility to a system corresponding to a tape cassette on which a contact type memory is mounted, electrodes 91 to 95 for a contact type interface are formed on the base substrate 90. The electrodes 91 to 95 are located at the position of the terminal portion 6c shown in FIG. 2.

By doing so, it becomes useful to ensure physical contact characteristics to electrodes for an interface at the side of the tape streaming drive corresponding to the contact type memory. Further, on the base substrate 90, if a signal terminal in the contact type interface is short-circuited to a ground terminal, it is possible to recognize that the tape cassette 1 including the noncontact type remote memory chip 4 is loaded into a drive apparatus which does not handle the noncontact type remote memory chip 4 as in this embodiment.

Figure 5:
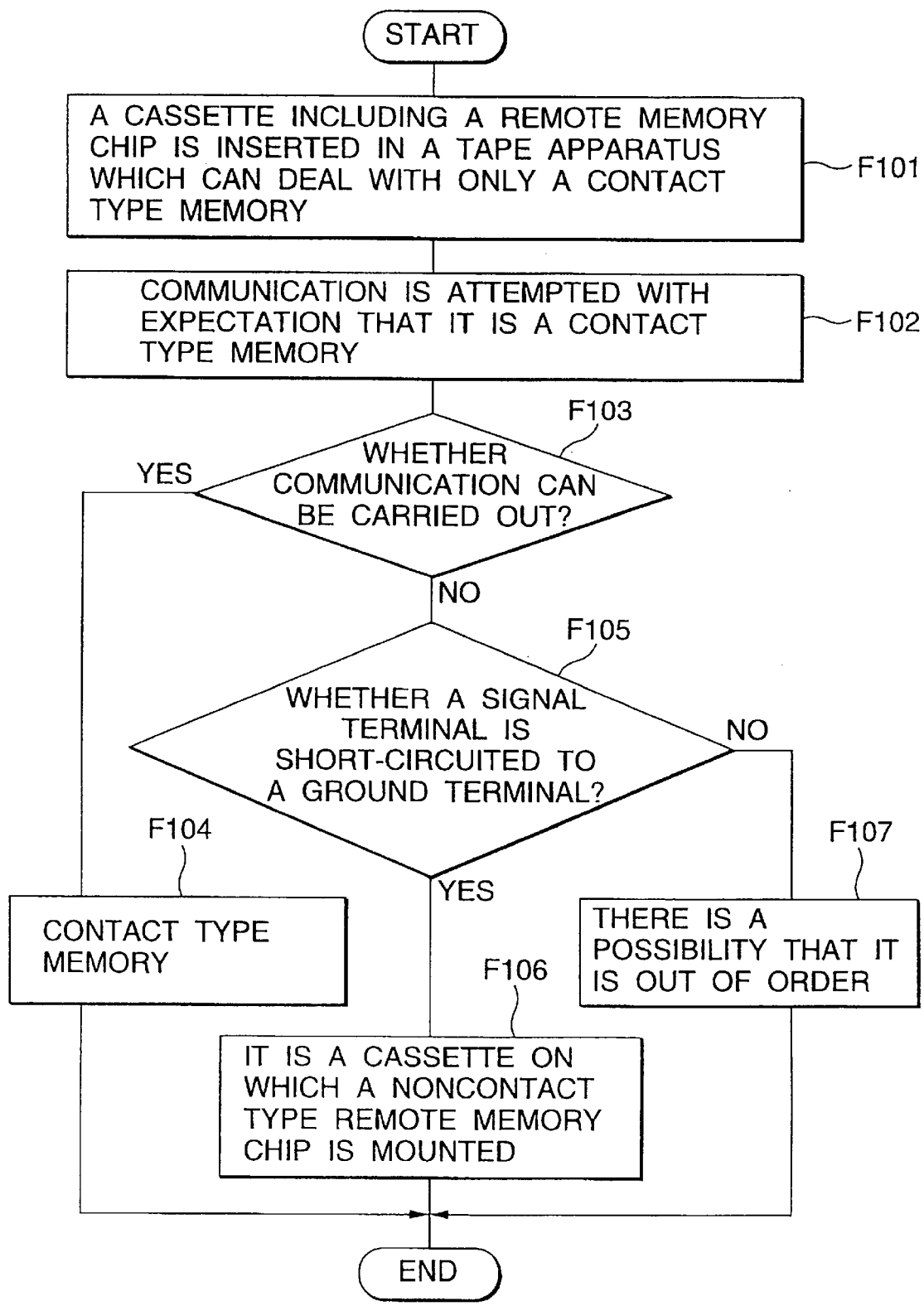
FIG. 5 is a flowchart of discriminating processing of a contact type memory handling apparatus.

For reference, an example of discriminating processing of the tape cassette 1 in a drive apparatus (hereinafter referred to as "non-handling drive apparatus") which can not handle the noncontact type tape cassette 1 of this embodiment is shown in FIG. 5.

In the case where a tape cassette including a contact type or noncontact type remote memory chip is loaded into the non-handling drive apparatus (F101), the drive apparatus attempts to execute communication while expecting that the remote memory chip is a contact type (F102). That is, communication is executed through the interface portion connected to the terminal portion 6c.

If communication is properly executed, it is judged that the tape cassette includes the contact type memory (F103→F104). However, in the case where communication can not be executed, if such judgement can be made that it is due to a short circuit between a signal terminal and a ground terminal, judgement can be made that it is the tape cassette of this embodiment including the noncontact type memory (F103→F105→F106). If the terminals are not in a short circuit state, judgement can be made that although it is the contact type memory, there is a possibility that the memory is out of order (F103→F105→F107).

Like this, it is possible to make the non-handling drive clearly discriminate the tape cassette including the noncontact type memory of this embodiment.

With respect to the remote memory chip 4 and the antenna 5, in addition to the system as shown in FIGS. 3 and 4 in which they are disposed on the base substrate 90 and are made built-in, there is also a system in which they are attached to the case body of the tape cassette 1.

Figure 6:
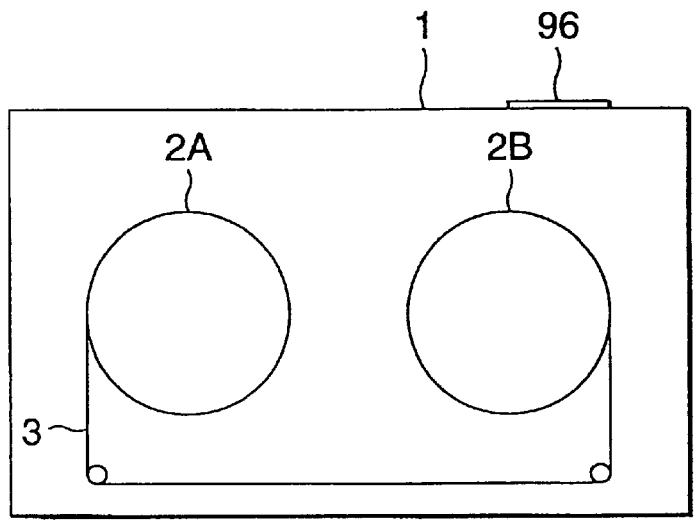
FIG. 6 is an explanatory view schematically showing an inner structure of another tape cassette according to the mode.
Figure 7:
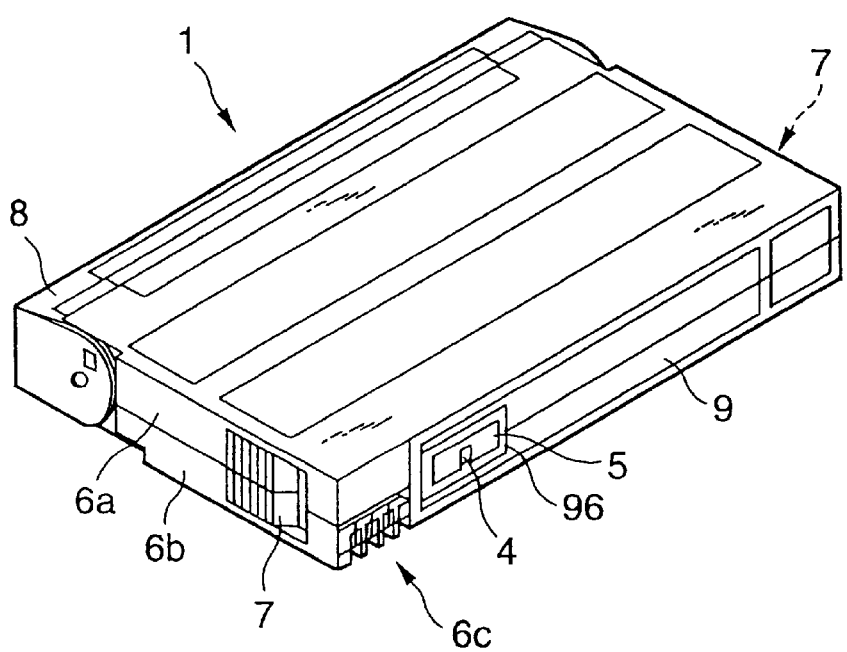
FIG. 7 is a perspective view showing an external appearance of another tape cassette according to the mode.

FIGS. 6 and 7 show examples in which the remote memory chip 4 and the antenna 5 are formed on a label base material 96, and the label base material 96 is attached to a back portion of the case body. Thus, as shown in FIG. 6, the inner structure of the tape cassette 1 becomes substantially the same as a normal tape cassette without a memory.

Figure 8:
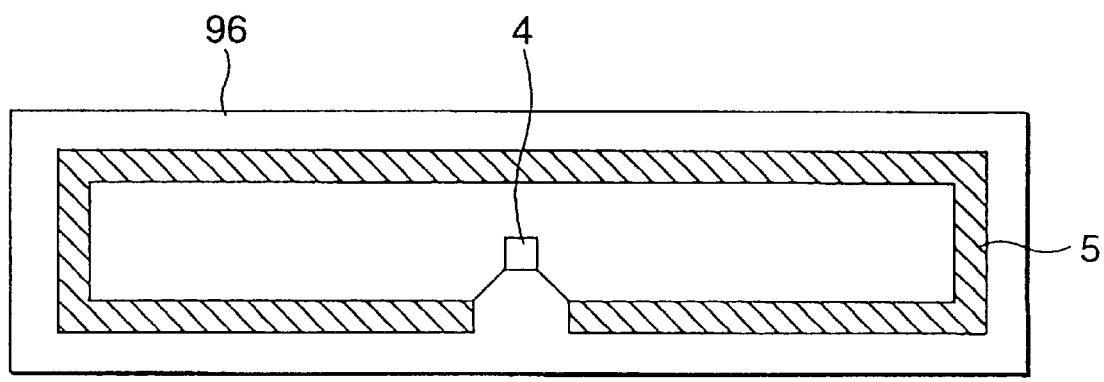
FIG. 8 is an explanatory view of a structural example of an attachment type remote memory chip of the tape cassette according to the mode.

As shown in FIG. 8, the antenna 5 is formed of copper foil or the like on the upper side of the label base material 96. The remote memory chip 4 is set and is connected to the antenna 5. Of course, also in this case, such modifications may be adopted that the antenna 5 is wound plural times, antennas are formed at both sides of the label base material 96 and are connected with a through hole or the like, or the label base material 96 is formed of laminated layers and the antenna 5 is sandwiched between them.

As a connection system between the antenna 5 and the remote memory chip 4, it is conceivable to adopt a system using wiring such as a wire bonding, or a system of directly connecting a pad of the remote memory chip 4 to the antenna 5 through a conductive material such as solder.

Of course, also in the case of this example, it is suitable to make protection by covering the connection portion between the remote memory chip 4 and the antenna 5 with a material proof against humidity.

Like this, according to the system in which the label base material is attached and the remote memory chip 4 is mounted, it becomes possible to use also a tape cassette without a remote memory chip as it is to grade up to a tape cassette with a remote memory chip.

2. Structure of a Remote Memory Chip and Data to be Recorded

Figure 9:
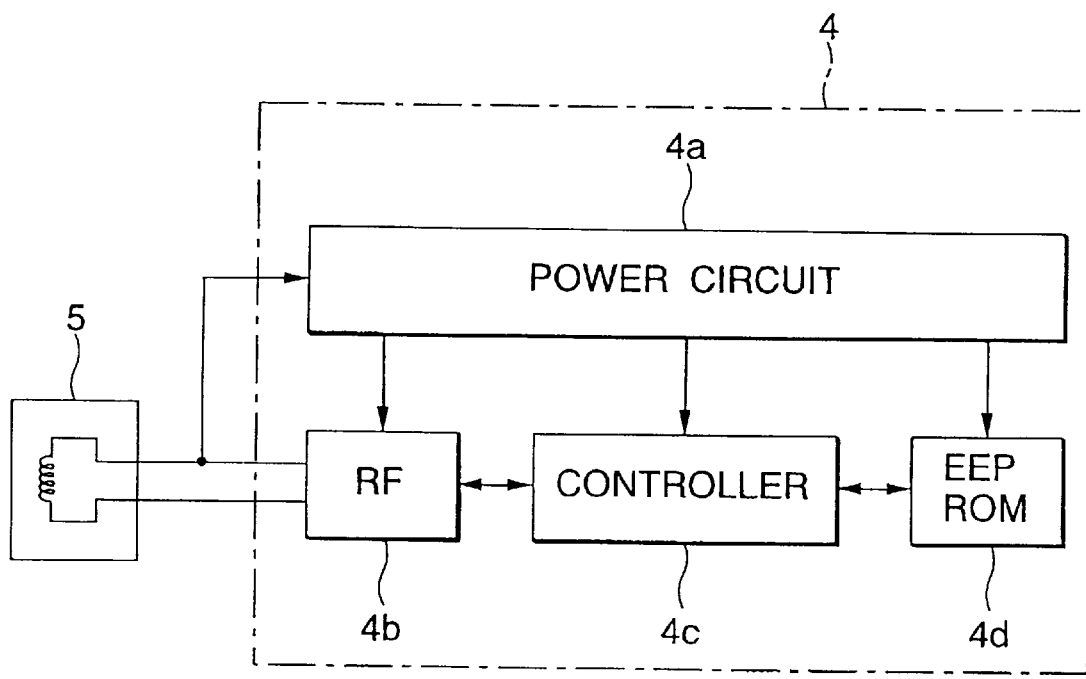
FIG. 9 is a block diagram of the remote memory chip provided in a tape cassette according to the mode.

An inner structure of the remote memory chip 4 is shown in FIG. 9.

For example, the remote memory chip 4 includes, as a semiconductor IC, a power circuit 4a, an RF processing portion 4b, a controller 4c, and an EEP-ROM 4d as shown in FIG. 9. For example, as described above, such remote memory chip 4 is mounted on the base substrate 90 (or the label base material 96) fixed to the inside of the tape cassette 1, and the antenna 5 is formed of a copper foil pattern.

This remote memory chip 4 is made such a structure as to receive power supply from the outside in a noncontact manner. A carrier wave of 13 MHz band is used for communication between the chip and the tape streaming drive 10 or the library apparatus 50 described later. The antenna 50 receives the electric wave from the tape streaming drive 10 or the library apparatus 50, and the power circuit 4a converts the carrier wave of 13 MHz band into DC power. The DC power as an operation power source is supplied to the RF processing portion 4b, the controller 4c, and the EEP-ROM 4d.

The RF processing portion 4b demodulates received information and modulates information to be transmitted.

The controller 4c executes and controls the decoding of a received signal from the RF processing portion 4b, and the processing corresponding to the decoded information (command), for example, writing/reading processing to the EEP-ROM 4d.

That is, the remote memory chip 4 is powered by receiving the electric wave from the tape streaming drive 10 or the library apparatus 50, and the controller 4c executes the processing instructed by the command superimposed on the carrier wave so that the data of the EEP-ROM 4d as the non-volatile memory are controlled.

Examples of management information content (contents) stored in the EEP-ROM 4d of each tape cassette 1 are shown in FIG. 10. Reference numerals (1) to (33) are given for convenience of explanation, and these do not correspond to a data arrangement format or the like in the EEP-ROM 4d. The contents shown here in the list are merely examples, and there is also a case where contents which are not exemplified here are stored.

Each of the contents will be described in brief.

(1) Memory Format

It shows such a kind that the memory disposed in the tape cassette 1 is a contact type or a noncontact type. In the remote memory chip 4 of this embodiment, a value indicating the noncontact type is stored.

(2) Control Flag

Various statuses at factory shipment are set forth.

(3) Identifier of Manufacturer

The code number of the manufacturer of the tape cassette 1 is set forth. For example, a code value of 1 byte corresponding to a maker is set, and it is stored.

(4) Second Identifier

Attribute information of a tape is set forth. That is, it is type information of the tape cassette 1. For example, a code value of 1 byte corresponding to the kind of the tape cassette with different tape length and tape thickness is set.

(5) Serial Number

The intrinsic number of the remote memory chip constituted by 32 words (32 bytes). An intrinsic code is assigned to each tape cassette 1.

(6) CRC Code of Serial Number

A 2-byte CRC is recorded in relation to the 32-byte serial number.

The information of 36 bytes, in total, of the contents (3) to (6) of manufacturer identifier, secondary identifier, serial number, and CRC code of serial number becomes information intrinsic to each tape cassette as data set forth at the shipment. Although not described in detail in the present specification, they are used for cassette authentication at the time of session identifier assignment processing. The session identifier assignment processing is a code number given to discriminate each tape cassette from a number of tape cassettes housed in the library apparatus.

(7) Date of Memory Manufacture
(8) Name of Memory Manufacture Line
(9) Name of Memory Manufacture Factory
(10) Name of Memory Manufacturer
(11) Type Name of Memory
(12) Name of Cassette Manufacture Line
(13) Date of Cassette Manufacture
(14) Name of Cassette Manufacture Factory
(15) Name of Cassette Manufacturer
(16) Name of Cassette In the above, data corresponding to the respective contents are set forth.

(17) Name of OEM Customer

The name of an OEM customer is set forth, and "GENERIC" is set forth for general use.

(18) Information of Tape Characteristic Specification

Tape thickness, length, electrical characteristic, magnetic characteristic, etc. Of the magnetic tape 3 are set forth.

(19) Maximum Communication Speed

Information transfer rate of the memory is set forth.

(20) Block Size

The block size of the memory, for example, "16 bytes" is recorded.

(21) Memory Capacity

Memory capacity, for example, "8K Bytes" is set forth.

(22) Start Address of Read Only Region

For example, 0000h.

(23) End Address of Read Only Region

For example, 00FFh.

The read only region in the memory is regulated by these.

(24) Various Pointers

Pointers to various data types on the memory. With respect to the data type in list structure, they become its roots.

(25) Memory Management Information

Management information with respect to the memory is recorded.

(26) Volume Attribute

Information such as write inhibit, read inhibit, processing continuation, etc. Of the magnetic tape 3 is set forth.

(27) Volume Information

Information relating to volume history such as the number of partitions of the magnetic tape 3 and the number of times of initialization is set forth.

(28) Volume use History Information

Information in which use history of each partition on the magnetic tape 3 is cleared and is made use history of the whole cassette. This includes not only the number of loading times of the tape but also intrinsic information relating to volume such as the number of loading times of the cassette.

(29) High Speed Search Support Map Information

Data map information necessary for realizing a high speed search function using the performance of a reel motor to the utmost degree without obtaining ID information in real time from the magnetic tape 3.

The high speed search function becomes an operation as follows: For example, in the process of recording data on the magnetic tape 3, logical position information is written in the high speed search support map every 10 m of tape running. When a file position on the magnetic tape 3 is searched and is looked for, this map is first confirmed and the 10 m unit position, with a sufficient margin, closest and before the file position is selected. Since the tape thickness and the reel diameter are known, if pulses of reel FG to the deduced position are counted, the tape can be run without reading any ID of the tape. That is, tape running is possible at such a high speed that reading of ID from the magnetic tape becomes impossible. When reaching the deduced position by such high speed running, the tape running is reduced to such a speed that the ID data can be read from the magnetic tape 3, and a normal high speed search is performed to finally search the file position instructed by the host computer.

(30) Unload Position Information

By using the memory (remote memory chip), multiple partitions numbered from the top of the magnetic tape in the ascending order can be effectively managed. In the multi-partition specification, loading/unloading can be performed in a unit of each partition. In the case where unloading is performed at an arbitrary partition, when next loading is performed, it is necessary to confirm whether loading was again performed to the place where unloading was performed previously. For that purpose, information of the unloading position is stored in the memory. By doing so, even if loading is performed to another place erroneously, it is possible to detect it and to obviate writing to an unexpected position and reading from an unexpected position.

(31) User Free Region

A memory region in which a user freely reads and writes through host interface (SCSI) and serial interface. The serial interface is an interface provided at the drive apparatus, and is an interface which is used in maintenance and by a controller of a library.

(32) Reserved Region

Memory free region for future extension.

(33) Session Identifier

As mentioned above, it is a 1-byte identifier which is given by the handling apparatus (library apparatus 50) for specifying the tape cassette (remote memory chip) when data are transferred to the remote memory chip 4. In addition to the above case where the session identifier is stored in the EEP-ROM 4d, it is conceivable that the identifier is not stored in the EEP-ROM 4d but is stored in the inner register of the controller 4c (that is, it is made data stored and held only during the continuation of operation).

3. Structure of a Tape Streaming Drive

Next, a structure of the tape streaming drive 10 will be described with reference to FIG. 11. This tape streaming drive 10 carries out recording/reproduction in the helical scan system to the magnetic tape 3 of the tape cassette 1.

In this drawing, a rotary drum 11 is provided with, for example, two recording heads 12A and 12B and three reproducing heads 13A, 13B, and 13C.

The recording heads 12A and 12B are structured such that two gaps with different azimuths are disposed to be extremely close to each other. Although the reproducing heads 13A and 13B are also made heads with different azimuths from each other, they are arranged in the state where they are separated by, for example, 90 degrees. The reproducing head 13C becomes a head used for reading immediately after recording (so-called read after write).

The rotary drum 11 is rotated by a drum motor 14A, and the magnetic tape 3 drawn out from the tape cassette 1 is wound around the drum. The magnetic tape 3 is fed by a capstan motor 14B and a not-shown pinch roller. The magnetic tape 3 is wound around the reels 2A and 2B as described above, and the reels 2A and 2B are rotated in the forward direction and reverse direction by reel motors 14C and 14D, respectively.

The drum motor 14A, the capstan motor 14B, and the reel motors 14C and 14D are rotated by application of electric power from a mechanical driver 17. The mechanical driver 17 drives the respective motors based on control from a servo controller 16. The servo controller 16 carries out rotational speed control of the respective motors so that running at normal recording/reproduction, tape running at high speed reproduction, tape running at fast-forwarding and rewinding, etc. are executed.

The EEP-ROM 18 stores constants etc. used for servo control of the respective motors by the servo controller 16.

The servo controller 16 is bidirectionally connected through an interface controller/ECC formatter 22 (hereinafter referred to as "IF/ECC controller") to a system controller 15 executing control processing of the whole system.

In this tape streaming drive 10, a SCSI interface 20 is used for input/output of data. For example, at the time of data recording, data are sequentially inputted from the host computer 40 through the SCSI interface 20 in a transmission data unit of fixed length record, and are supplied to a compression/expansion circuit 21. In such a tape streaming drive system, there is also a mode in which data are transferred from the host computer 40 in a collective unit of variable length data.

In the compression/expansion circuit 21, if necessary, inputted data are subjected to compression processing by means of a predetermined system. As an example of the compression system, for example, if a compression system of LZ codes is adopted, in this system, a specific code is assigned to a character string processed in the past and is stored in the form of a dictionary. A subsequently inputted character string is compared with the contents of the dictionary, and if the character string of input data coincides with a code of the dictionary, these character string data are replaced with the code of the dictionary. Data of an input character string not coincident with the dictionary are sequentially given a new code and are registered in the dictionary. The data of the input character string are registered in the dictionary and the character string data are replaced with the code of the dictionary in this way, so that data compression is carried out.

The output of the compression/expansion circuit 21 is supplied to the IF/ECC controller 22, and the IF/ECC controller 22 temporarily stores the output of the compression/expansion circuit 21 in a buffer memory 23 through its control operation. The data stored in the buffer memory 23 finally come to be treated in a fixed length unit corresponding to 40 tracks of the magnetic tape, called Group, by control of the IF/ECC controller 22, and ECC format processing is carried out to these data.

As the ECC format processing, an error correcting code is added to recording data, and the data are subjected to modulation processing and are supplied to an RF processing portion 19 so as to be suitable for a magnetic record.

The RF processing portion 19 applies processing, such as amplifying and record equalizing, to the supplied recording data to generate a recording signal, and supplies the signal to the recording heads 12A and 12B. By this, recording of data to the magnetic tape 3 from the recording heads 12A and 12B is carried out.

A data reproducing operation will be described in brief. The recording data of the magnetic tape 3 are read out by the reproducing heads 13A and 13B as an RF reproducing signal, and the reproducing output is subjected to reproduction equalizing, reproduction clock generation, binarization, decoding (for example, viterbi decoding), and the like at the RF processing portion 19.

The thus read-out signal is supplied to the IF/ECC controller 22, and is first subjected to error correction processing and the like. Then the signal is temporarily stored in the buffer memory 23, and is read out at a predetermined point of time to be supplied to the compression/expansion circuit 21.

In the compression/expansion circuit 21, on the basis of judgement of the system controller 15, if the data have been compressed at the time of recording by the compression/expansion circuit 21, data expansion processing is carried out here, and if the data are non-compressed data, the data expansion processing is not carried out, but the data are passed as they are and are outputted.

The output data of the compression/expansion circuit 21 are outputted to the host computer 40 through the SCSI interface 20 as reproduction data.

This drawing shows the remote memory chip 4 in the tape cassette 1. When the tape cassette 1 main body is loaded into the tape streaming drive, this remote memory chip 4 is put in such a state that input/output of data to the system controller 15 becomes possible in a noncontact state through the remote memory interface 30.

As the remote memory interface 30, a data interface 31, an RF interface 32, and an antenna 33 are provided.

Figure 12:
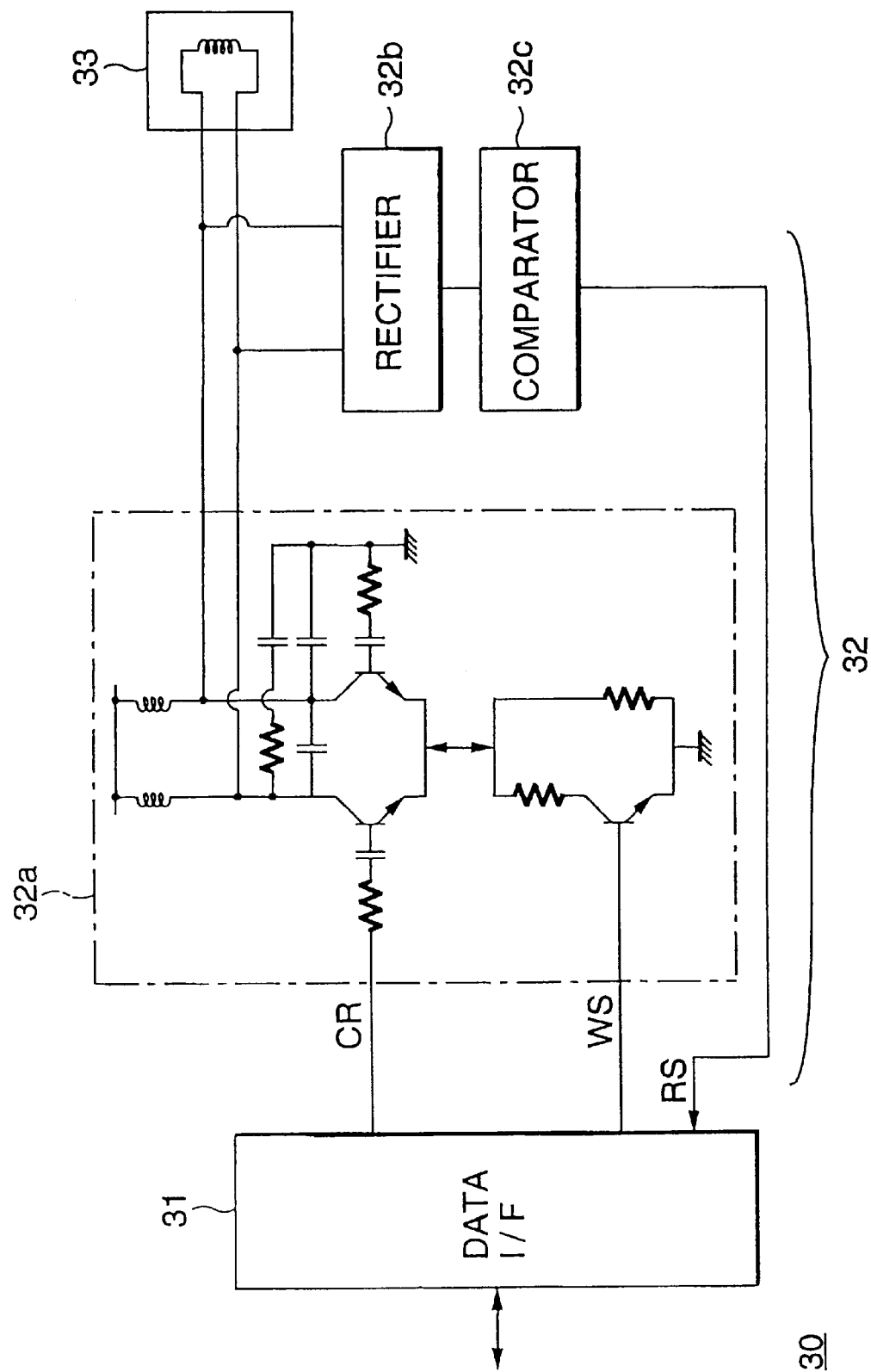
FIG. 12 is a block diagram of a remote memory interface disposed in the tape streaming drive and a library apparatus according to the mode.

The structure of the remote memory interface 30 is shown in FIG. 12.

The data interface 31 carries out exchange of data to the system controller 15. As described later, data transfer to the remote memory chip 4 is carried out in the form of a command from the equipment side and an acknowledgement from the remote memory chip 4 in response to that. When the system controller 15 issues the command to the remote memory chip 4, the data interface 31 receives the command data and supplies it to the RF interface 32. Besides, the data interface 31 supplies a carrier frequency CR (13 MHz) to the RF interface 32.

In the RF interface 32, as shown in FIG. 12, there is formed an RF modulation/amplifying circuit 32a which executes amplitude modulation (100 KHz) of the command (transmission data) WS, superimposes it on the carrier frequency CR, and amplifies the modulated signal to apply it to the antenna 33.

By this RF modulation/amplifying circuit 32a, radio transmission of the command data is carried out from the antenna 33 to the antenna 5 in the tape cassette 1. At the side of the tape cassette 1, with the structure as described in FIG. 9, the command data are received by the antenna 5 so that the tape cassette is supplied with electric power, and the controller 4c operates in accordance with the contents instructed by the command. For example, data transmitted with the writing command are written in the EEP-ROM 4d.

When a command is issued from the remote memory interface 30 in this way, the remote memory chip 4 issues an acknowledgement in response to that. That is, the controller 4c of the remote memory chip 4 modulates and amplifies the data as the acknowledgement through the RF 4b, and transmits and outputs it from the antenna 5.

In the case where such an acknowledgement is transmitted and is received by the antenna 33, after the received signal is rectified by a rectifying circuit 32b of the RF interface 32, it is demodulated as data by a comparator 32c. Then the data are supplied from the data interface 31 to the system controller 15. For example, in the case where a read-out command is issued from the system controller 15 to the remote memory chip 4, the remote memory chip 4 transmits data read out from the EEP-ROM 4d, together with a code as an acknowledgement in response to that. The acknowledgement code and the read-out data are received and demodulated by the remote memory interface 30 and are supplied to the system controller 15.

As described above, the tape streaming drive 10 includes the remote memory interface 30 so that access to the remote memory chip 4 in the tape cassette 1 becomes possible.

Incidentally, in such data exchange in a noncontact manner, although the data are superimposed on the carrier of 13 MHz band with amplitude modulation of 100 KHZ, the original data become packet data.

That is, a header, parity, and other necessary information are added to the data as the command and the acknowledgement to make packet, and the packet is modulated after code conversion, so that the data can be transmitted and received as stable RF signals.

A technique for realizing such noncontact interface has been introduced as a technique disclosed in Japanese Patent Application filed by the same assignee and was granted (Japanese Patent No. 2550931).

Figure 11:
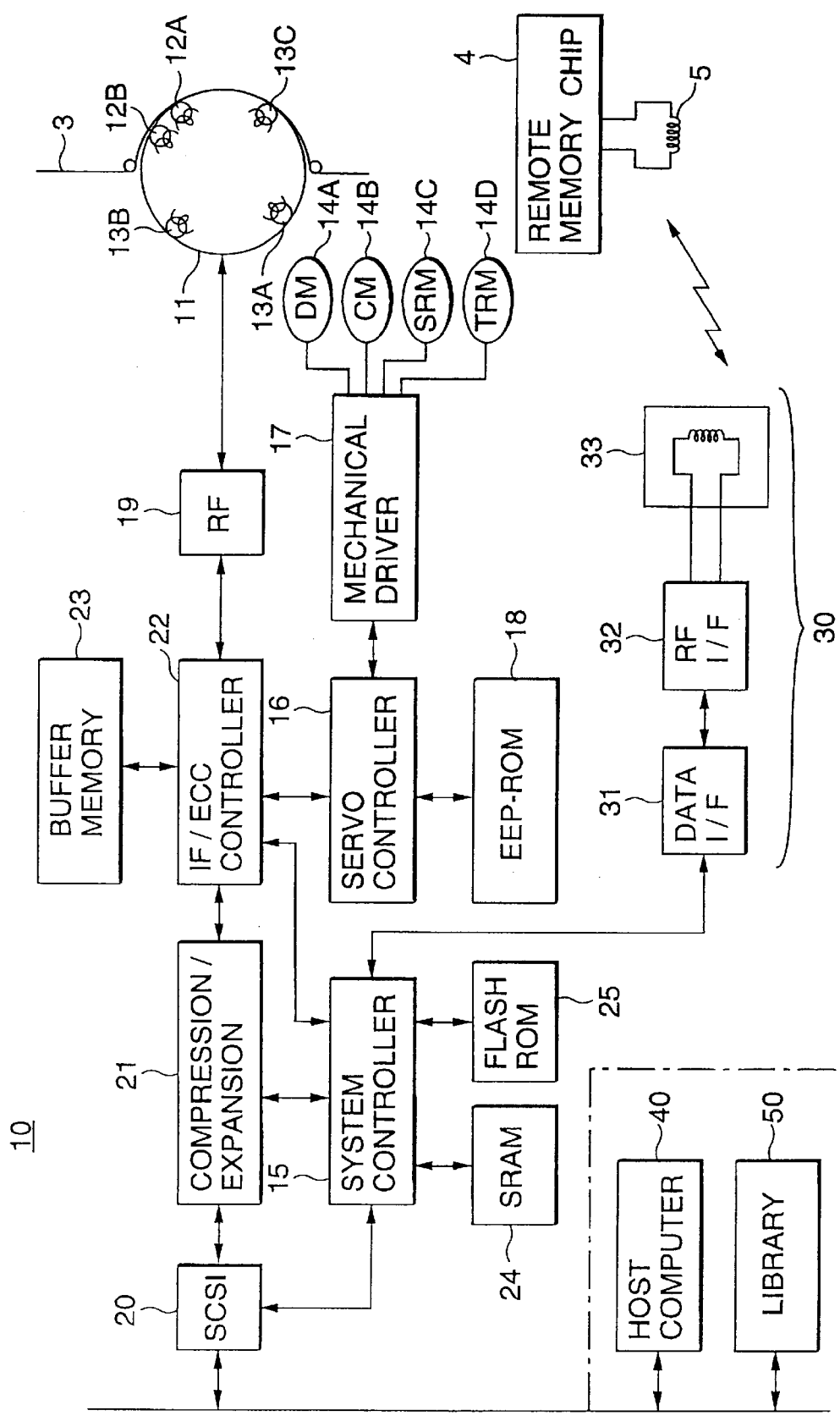
FIG. 11 is a block diagram of a tape streaming drive according to the mode.

In FIG. 11, an S-RAM 24 and a flash ROM 25 store data used by the system controller 15 for various kinds of processing.

For example, in the flash ROM 25, constants and the like used for control are stored. The S-RAM 24 is used as a work memory or is made a memory used for storage, arithmetic processing, or the like of data read out from the remote memory chip 4, data to be written in the remote memory chip 4, mode data set in a unit of tape cassette, various flag data, and the like.

The S-RAM 24 and the flash ROM 25 may be structured as inner memories of a microcomputer constituting the system controller 15, alternatively, a part of the region of the buffer memory 23 may be used as a work memory.

Although mutual transmission of information is carried out between the tape streaming drive 10 and the host computer 40 by using the SCSI interface 20, the host computer 40 carries out various kinds of communication with the system controller 15 by using SCSI commands.

4. Structure of a Library Apparatus

Subsequently, the library apparatus 50 will be described.

Figure 13:
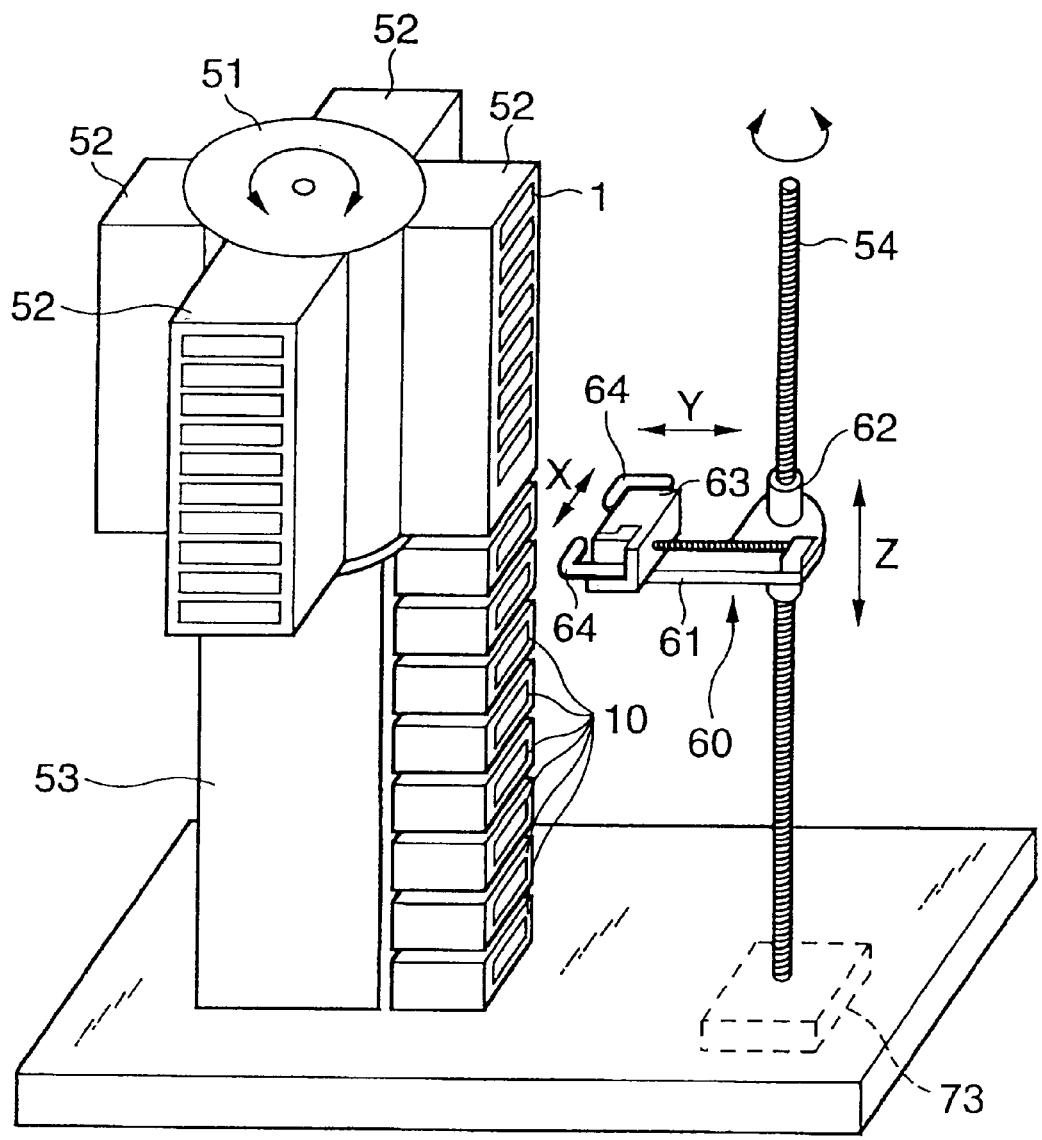
FIG. 13 is an explanatory view of a structure of the library apparatus according to the mode.
Figure 14:
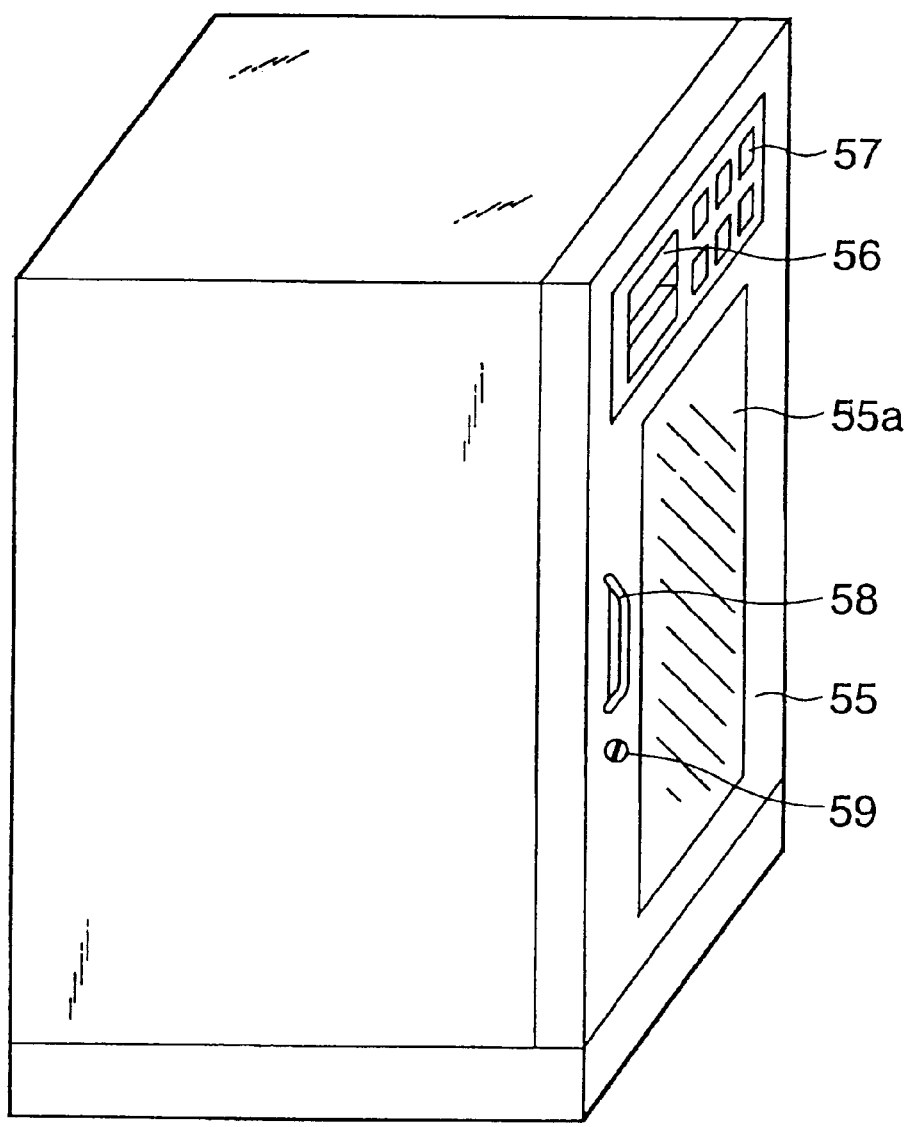
FIG. 14 is an explanatory view of a structure of an outer case of the library apparatus according to the mode.

FIG. 14 shows an external appearance of an outer case box of the library apparatus 50, and FIG. 13 shows a mechanism as the library apparatus 50 disposed in the outer case box.

First, the mechanism as the library apparatus 50 will be described with reference to FIG. 13.

As shown in the drawing, as the library apparatus 50, a carousel 51 to which magazines 52 of, for example, 4 units each capable of housing the tape cassettes 1 of, for example, 15 volumes are attached is rotatably disposed on a controller box 53. The magazine 52 is selected by rotation of the carousel 51.

A hand unit 60 for carrying out housing/extraction of the tape cassette 1 with respect to the magazine 52 is disposed movably in the up and down direction (Z direction) along a Z shaft 54. That is, a gear groove is formed in the Z shaft 54, and a bearing portion 62 of the hand unit 60 is engaged with the gear groove, so that the hand unit 60 is moved up and down through rotation of the Z shaft 54 by a Z motor 73.

In the hand unit 60, a hand table 63 is attached to a base 61 movably in a Y direction, and a pair of hands 64 are formed at the tip of the hand table 63. The pair of hands 64 are opened and closed in an X direction, so that the tape cassette 1 can be held or released.

Further, a plurality of tape streaming drives 10 are disposed at the lower portion of the carousel 51. Each of the tape streaming drives 10 has the structure of FIG. 11 described above.

By such mechanism, the hand unit can extract the tape cassette 1 from the desired magazine 52 on the carousel 51, and convey and load it into the desired tape streaming drive 10. On the contrary, the hand unit can house the tape cassette 1 extracted from some tape streaming drive 10 at the desired position of the desired magazine.

With respect to the outer case box housing this mechanism, as shown in FIG. 14, almost all front surface is made a front door 55, and the door can be opened and closed by a knob 58. The front door 55 can be locked by a key 59. Further, a portion as a transparent panel 55a is provided at the front door 55 so that the inside can be seen.

An operation panel 57 and a post 56 are formed at an upper side of the front door 55. The post 56 is formed so as to add and extract the tape cassette 1 while the front door 55 is closed. Although not shown in FIG. 13, it is designed such that the tape cassette 1 inserted from the post 56 can be conveyed to a desired position in the magazine 52 by the hand unit 60. The hand unit 60 can eject the conveyed tape cassette 1 from the post 56.

Various keys operated by a user are disposed on the operation panel 57. Key operation information of the operation panel 57 is inputted to a library controller 80 described later, and an action in response to an operation is carried out by control of the library controller 80. As user's operations through this operation panel 57, there are insertion/ejection of the tape cassette 1 from the post 56, instructions of adjusting operation of the library apparatus 50, and the like.

Figure 15:
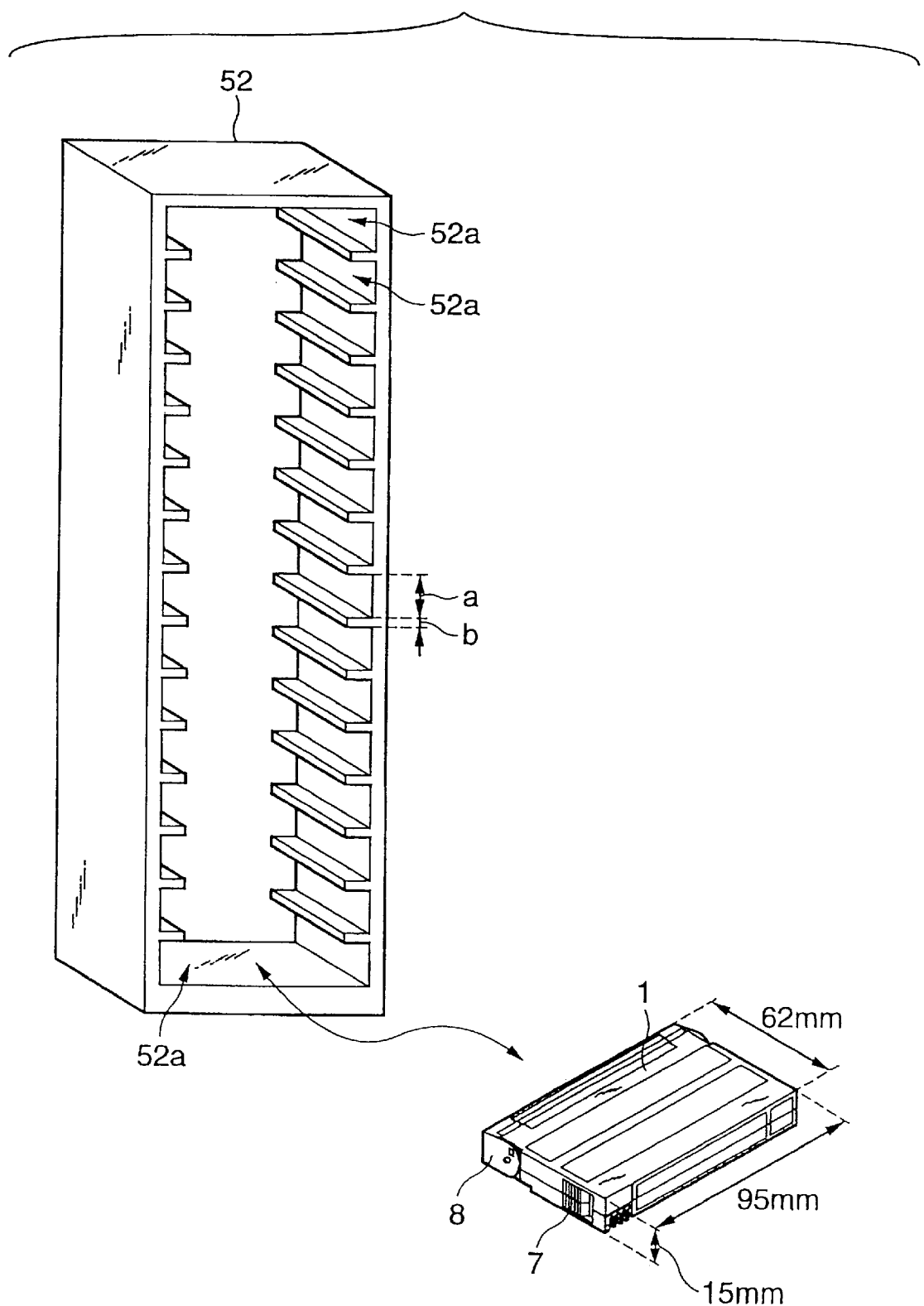
FIG. 15 is an explanatory view of a magazine of the library apparatus according to the mode.

FIG. 15 shows a structure of the magazine 52.

In each of the magazines 52, housing portions 52a of about 15 units are formed, and the tape cassette 1 can be housed in each of the housing portions 52a.

The size of the housing portion 52a is set such that the tape cassette 1 can be easily put and a suppressing force to some degree can be applied so as to prevent the tape cassette 1 from falling away at the time of rotation of the carousel 51 or the like. Further, the size is set such that the cassette is easily extracted by the hands 64.

For example, the height size "a" of the housing portion 52a is set at about a=16 mm when the thickness of the tape cassette 1 is about 15 mm.

The partition size "b" of the housing portion 52a is set at, for example, about b=3 mm from the viewpoint that the partition is made as thin as possible so that a number of housing portions 52a can be formed, while it has a thickness to some degree to secure the strength.

A depth size is set such that the back side of the tape cassette 1 slightly protrudes in the state where the tape cassette 1 is housed in the housing portion 52a.

Figure 16:
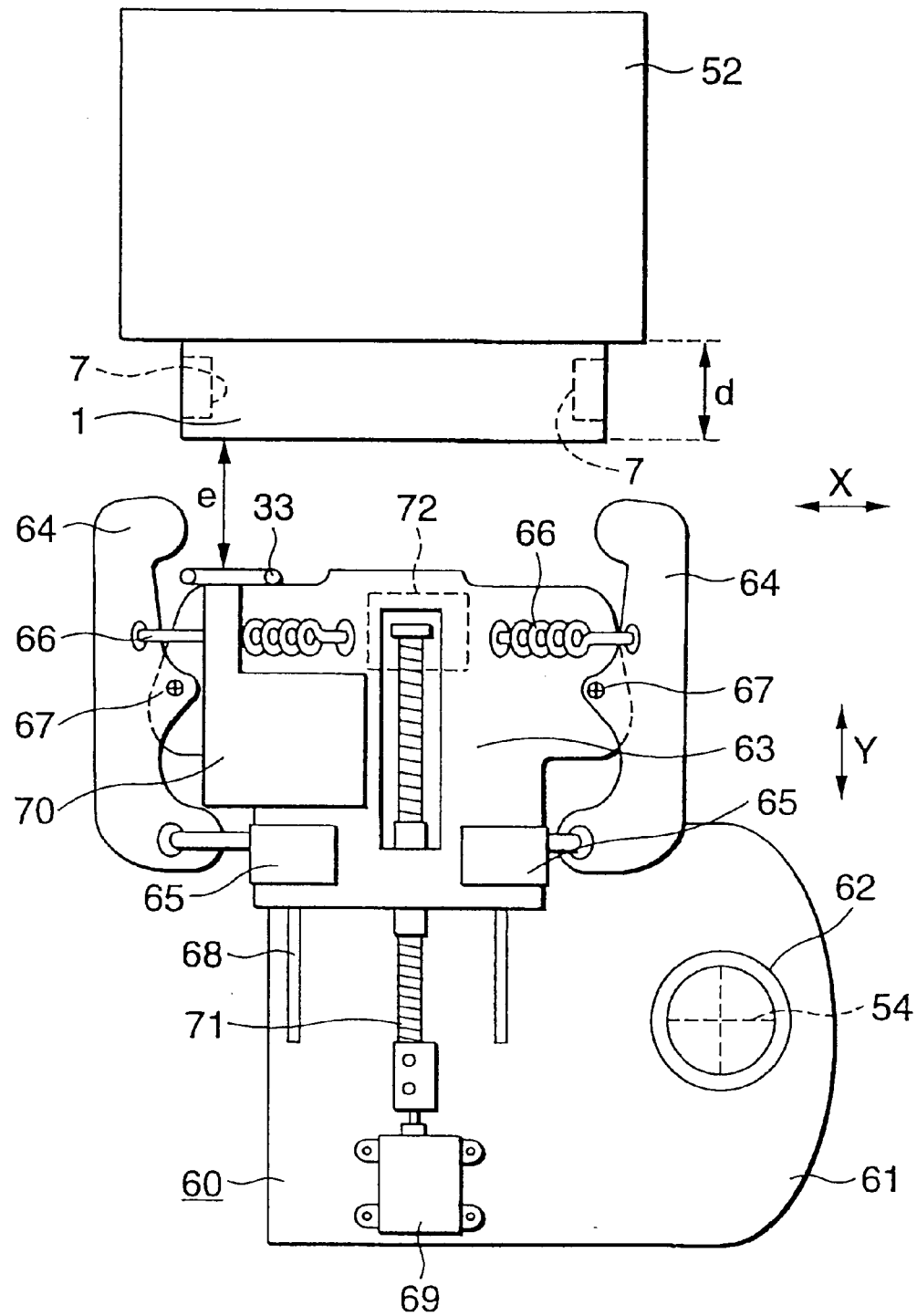
FIG. 16 is an explanatory view of a hand unit of the library apparatus according to the mode.

That is, FIG. 16 shows the tape cassette 1 in the magazine 52 seen in a plane direction, and the tape cassette 1 is housed in such a state that the back side thereof protrudes by a size "d" in the drawing. At this time, the size "d" is set at, for example, about d=20 mm.

By doing so, the tips of the hands 64 can be easily put in the recess portions 7, 7 of both sides of the tape cassette 1.

The structure and operation of the hand unit 60 will be described with reference to FIGS. 16, 17 and 18.

Figure 17:
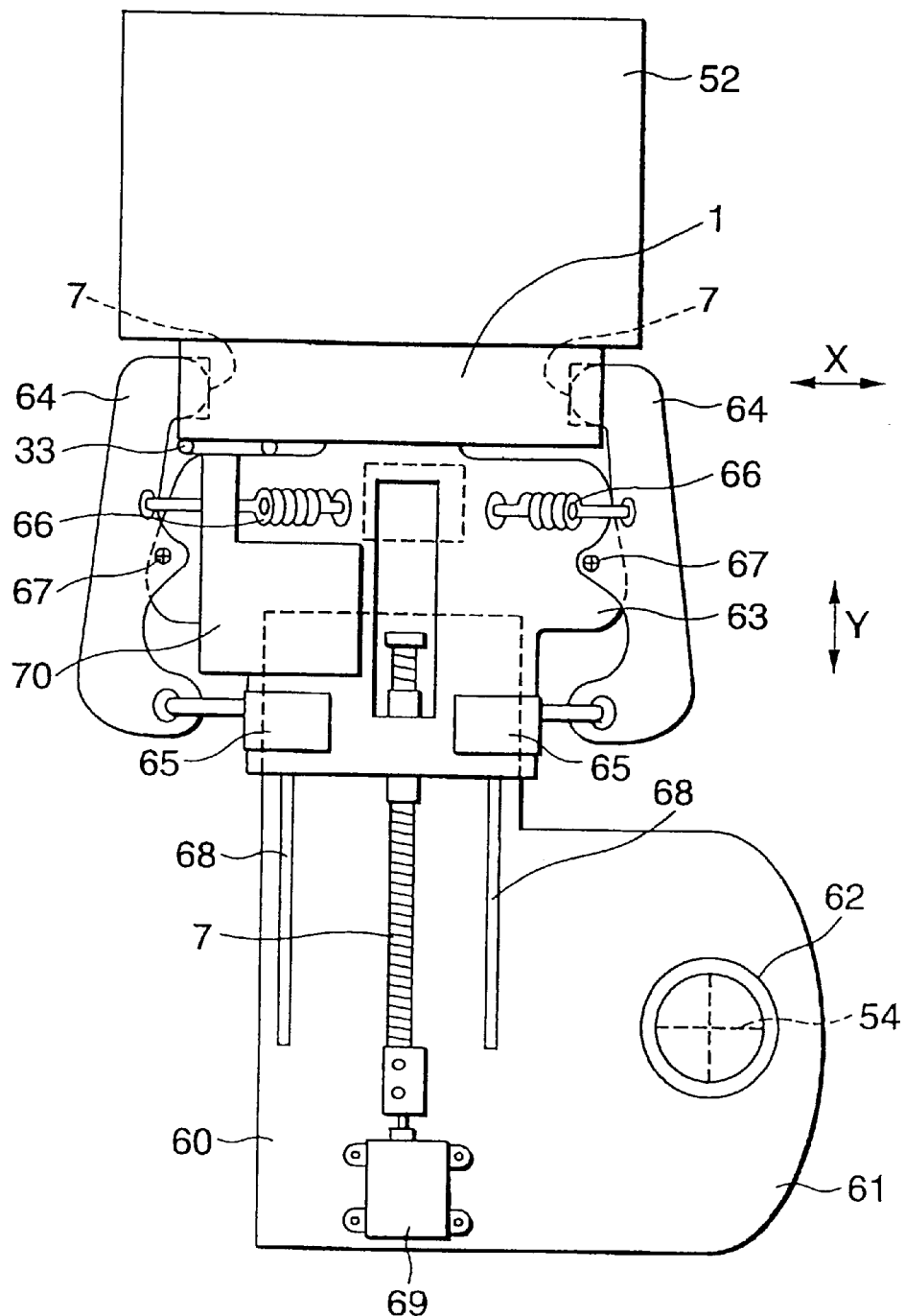
FIG. 17 is an explanatory view of the hand unit of the library apparatus according to the mode.
Figure 18:
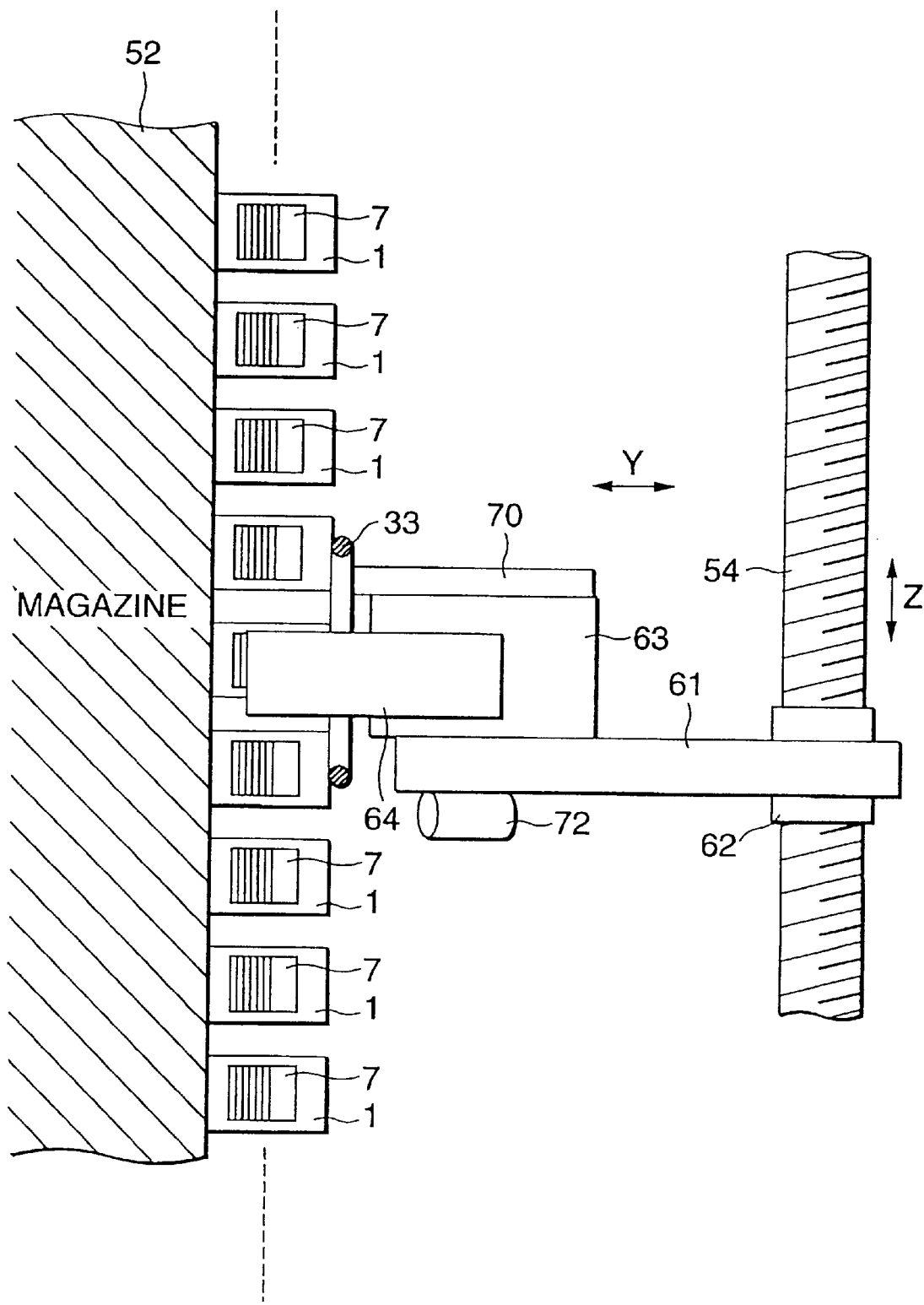
FIG. 18 is an explanatory view of the hand unit of the library apparatus according to the mode.

FIG. 16 shows a state where the hand unit 60 is apart from some tape cassette 1 at a position confronting the tape cassette 1, FIG. 17 shows a state where the hand unit 60 holds the tape cassette 1, and FIG. 18 shows the state of FIG. 17 seen from a side direction.

In the hand unit 60, as described above, the hand table 63 is movably attached to the base 61, and the hands 64, 64 are attached to the hand table 63.

All the hand unit 60 is held by the Z shaft 54 in the state where the bearing portion 62 provided on the base 61 is engaged with the Z shaft 54, so that the hand unit 60 is moved in the up-and-down direction by the rotation of the Z shaft 54, and at that time, it is located at a position confronting some housing portion 52a of the magazine 52 or some tape streaming drive 10.

The bearing portion 62 is formed at a position shifted from the magazine 52 seen from the direction of the front door 55, so that the Z shaft 54 does not become an obstacle when the front door 55 is opened and the tape cassette 1 is housed in or extracted from the magazine 52.

The hand table 63 can be moved along a guide rail 68 on the base 61. That is, a Y shaft 71 having a gear groove is engaged with the hand table 63, and the Y shaft 71 is forwardly/reversely rotated by a Y motor 69, so that the hand table 63 is moved in the direction approaching or going away from the magazine 52.

The pair of hands 64, 64 each having a supporting shaft 67 as a rotation fulcrum are attached to the hand table 63. Each of the hands is put in a state where its rear end side is drawn by a plunger 65 and a position near the tip is pulled by a spring 66 from the hand table 63. Thus, in a period when the plunger 65 is turned off, as shown in FIG. 17, such a state is realized that both the hands 64 are closed by energization of the spring 66. When the plunger 65 is turned on and the hand rear portion is drawn, the state of FIG. 16, that is, the state where both the hands 64 are opened against the energization of the spring 66 is realized.

When the operation of extracting some tape cassette 1 from the magazine 52 is executed, the Z shaft 54 is first driven so that the hand unit 60 is moved to the height position of the housing portion 52a in which the objective tape cassette 1 is housed.

Subsequently, such a state is realized that both the hands 64, 64 are opened by the plunger 65 as shown in FIG. 16, and in that state, the hand table 63 is moved by the Y motor 69 in the direction approaching the magazine 52.

When the hand table 63 has been moved, the plunger 65 is turned off at that time, so that both the hands 64 are moved in the closing direction by energization of the spring 66. By this, as shown in FIG. 17, such a state is realized that the hands 64, 64 hold both side portions (recess portions 7) of the tape cassette 1 between them.

The hand unit 64 is moved by the Y motor 69 in the direction going away from the magazine 52 while that state is kept, so that the tape cassette 1 is extracted.

The extracted tape cassette 1 is conveyed by the hand unit 60 to the predetermined tape streaming drive 10, the post 56, another housing portion 52a of the magazine, or the like.

When the tape cassette 1 is to be housed in the magazine 52, the operation opposite to the above procedure is carried out.

As described above, the remote memory chip 4 is mounted in the inside of the tape cassette 1, and this library apparatus 50 can also access the remote memory chip 4 similarly to the tape streaming drive 10.

For that purpose, as shown in FIGS. 16, 17, and 18, a remote memory drive box 70 is disposed on the hand table 63, and a circuit portion (circuit portion similar to the remote memory interface 30 in FIG. 11) as the remote memory interface 30 is contained here.

The antenna 33 is provided at a position opposite to a position of the back of the tape cassette 1 where the remote memory chip 4 is disposed.

For example, in the state of FIG. 17, the antenna 33 and the remote memory chip 4 in the tape cassette 1 are put in a state where they are rather close to each other, and in this state, access through wireless communication with the remote memory chip 4 can be executed.

In the state of FIG. 16, although the antenna 33 and the remote memory chip 4 are separated from each other by about a distance "e", if the distance "e" is several cm, access can be made.

Incidentally, FIGS. 16, 17 and 18 show the state where a bar code reader 72 is provided at the lower portion of the base 61.

For example, when the bar code reader 72 is provided in this way, in the case where the tape cassette 1 to which the bar code label is affixed is housed, the bar code information can be read. Incidentally, in the case where the bar code reader 72 is provided, the relation between the arrangement position of the bar code reader 72 and that of the antenna 33 is not particularly limited, but, for example, the bar code reader 72 may be disposed on the hand table.

Figure 19:
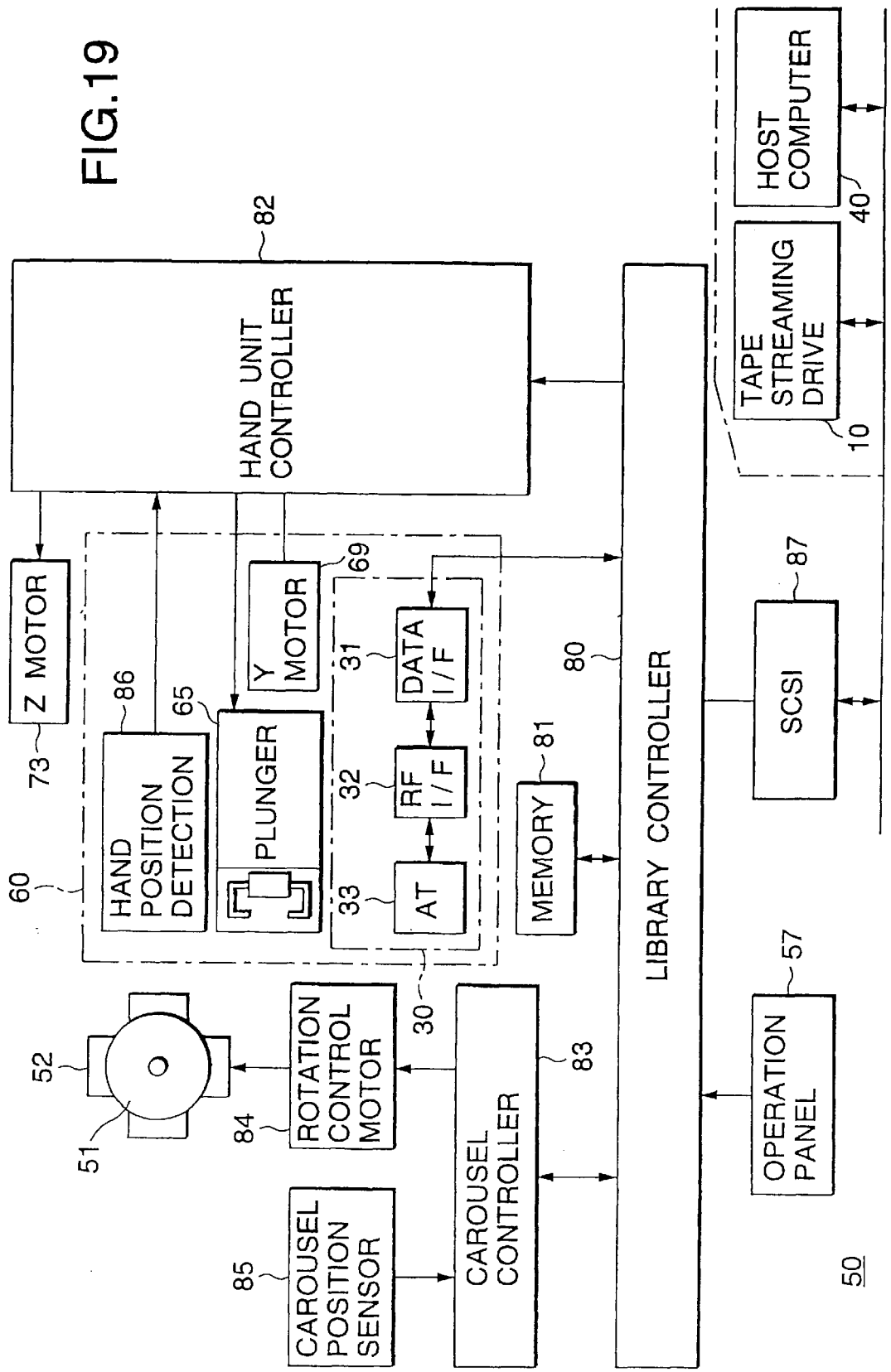
FIG. 19 is a block diagram of the library apparatus according to the mode.

FIG. 19 shows an inner structure of the library apparatus 50 having the mechanism as described above.

A library controller 80 is a portion which controls all the library apparatus 50. The library controller 80 can communicate with the tape streaming drive 10 and the host computer 40 through a SCSI interface 87.

Thus, in accordance with SCSI commands from the host computer 40, the controller executes conveyance of the tape cassette 1 among the magazine 52, the tape streaming drive 10, and the post 56, and the control operation (for example, access to the remote memory chip 4 in the tape cassette 1) to the housed tape cassette 1.

A memory 81 becomes a work memory used for processing by the library controller 80. As described above, the operation information from the operation panel 57 is supplied to the library controller 80, and the library controller 80 executes necessary action control in response to the operation.

In response to the instructions of the library controller 80, a carousel controller 83 drives a rotation control motor 84, and executes an operation to rotate the carousel 51. That is, an operation of selecting the magazine 52 to be made opposite to the hand unit 64 is executed. A carousel position sensor 85 detects a rotation position of the carousel 51, that is, detects which magazine 52 is selected (opposite to the hand unit 64). The carousel controller 83 rotates and drives the carousel 51 while taking in information from the carousel position sensor 85, so that the objective magazine 52 is selected.

A hand unit controller 82 drives the hand unit 60 on the basis of instructions of the library controller 80.

That is, the Z motor 73 is driven so that the hand unit 60 is moved in the Z direction. At this time, since the position of the hand unit 60 in the Z direction is detected by a hand position detecting portion 86, the hand unit controller 82 drives the Z motor 73 while confirming the position detecting information from the hand position detecting portion 86, so that the hand unit 60 can be positioned at a predetermined height position instructed by the library controller 80.

Besides, the hand unit controller 82 drives the Y motor 69 and the plunger 65 at predetermined timing to execute the extracting or housing operation of the tape cassette 1 by the hands 64 as described above.

As described above, the circuit portion as the remote memory interface 30 is housed in the remote memory drive box 70 provided in the hand unit 60.

This remote memory interface 30 is constituted by a data interface 31, an RF interface 32, and an antenna 33 similarly to the remote memory interface 30 in the tape streaming drive 10 described in FIG. 11, and has the structure as in FIG. 12.

This remote memory interface 30 is connected to the library controller 80.

Thus, as is understood from the explanation of FIG. 12, through this remote memory interface 30, the library controller 80 issues commands to the remote memory chip 4 in the tape cassette 1 in the magazine 52 close to the antenna 33 or that in the tape cassette 1 held by the hand unit 60 and can execute writing/reading access.

Of course, also in this case, the access is established by a command from the side of the library controller 80 and an acknowledgement from the remote memory chip 4.

Although not shown, in the case where the bar code reader 72 is provided as described above, such a structure is adopted that a drive circuit system of the bar code reader 72 is provided and the read information is supplied to the library controller 80.

5. Structure of an Antenna of a Library Apparatus

According to the library apparatus 50 or the tape streaming drive 10 described above, access to the remote memory chip 4 in the tape cassette 1 can be made.

As described above, the remote memory chip 4 generates electric power from a received electric wave at the time of access and the power supply is turned on.

Then a desired command (for example, command to demand data writing or reading) is issued to the predetermined remote memory chip 4, and an acknowledgement from the remote memory chip 4 in response to the command is received, so that various kinds of control to the remote memory chip 4 are executed.

However, in the library apparatus 50, as described above, at the portion where a number of tape cassettes 1 are adjacently disposed in the magazine 52, access (command transmission and acknowledgement reception) to only the objective specific tape cassette 1 must be carried out.

At this time, there is also a case where a command is transmitted to a non-objective tape cassette adjacent to the objective tape cassette or an acknowledgement from the non-objective tape cassette is received.

In this embodiment, the shape and the size of the antenna 33 attached to the tip of the hand unit 60 are set such that the foregoing state can be overcome and access can be excellently made to only the remote memory chip 4 of the objective tape cassette.

Figure 20:
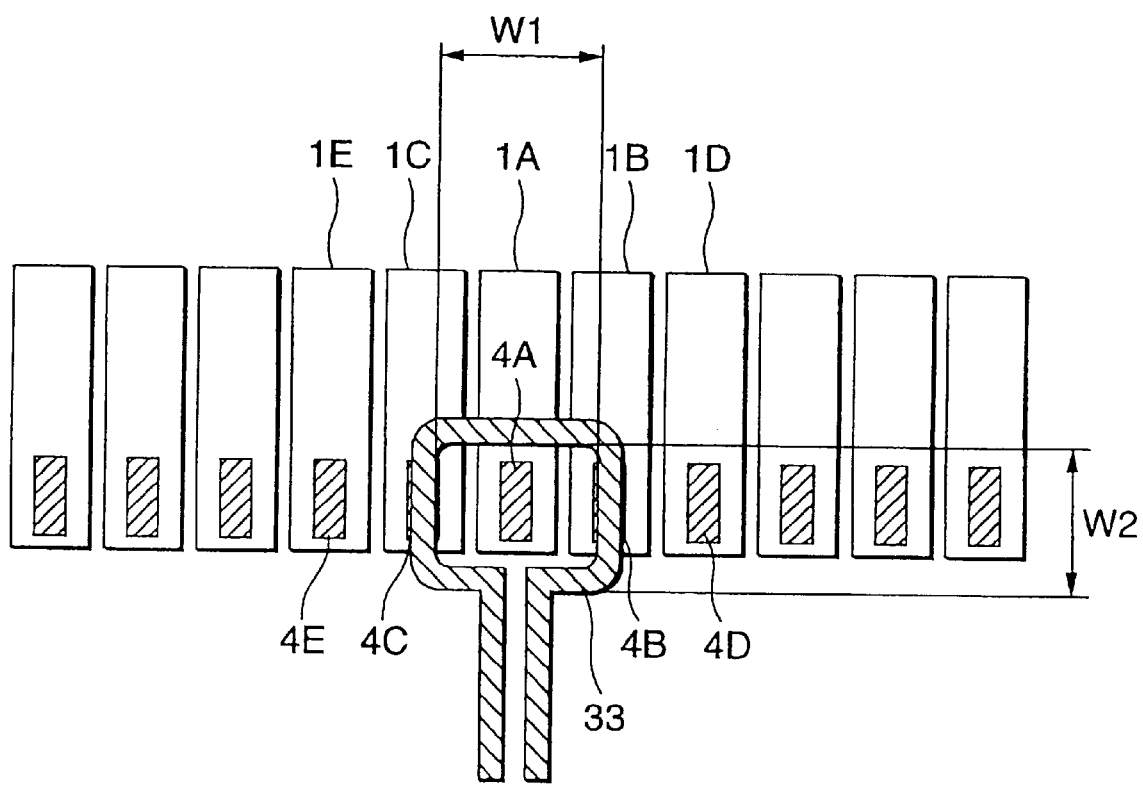
FIG. 20 is an explanatory view of a confronting state between an antenna of the library apparatus and a tape cassette according to the mode.

That is, as is understood from FIGS. 17 and 18, the antenna 33 is formed into a loop shape, and at this time, the size of the loop-shaped antenna is made to realize a state as in FIG. 20 with respect to the tape cassette 1 housed in the magazine 52.

That is, in view of an interval between the arranged tape cassettes 1 (1A, 1B . . . ) and the shape of the antenna 5 connected to the remote memory chip 4 (4A, 4B . . . ) in each tape cassette 1, the horizontal and vertical sizes of the loop-shaped portion of the antenna 33, W1 and W2, are regulated as shown in the drawing.

Here, at least the size W1 is made to substantially coincide with the interval of the remote memory chips 4 in the arranged tape cassettes 1. That is, in the state where the antenna 33 is made to confront the front of the remote memory chip 4A as shown in the drawing so that access to the remote memory chip 4A of the tape cassette 1A is made, both side portions (element portions) constituting the loop of the antenna 33 confront almost the fronts of the remote memory chips 4B and 4C of the adjacent tape cassettes 1B and 1C.

Figure 21:
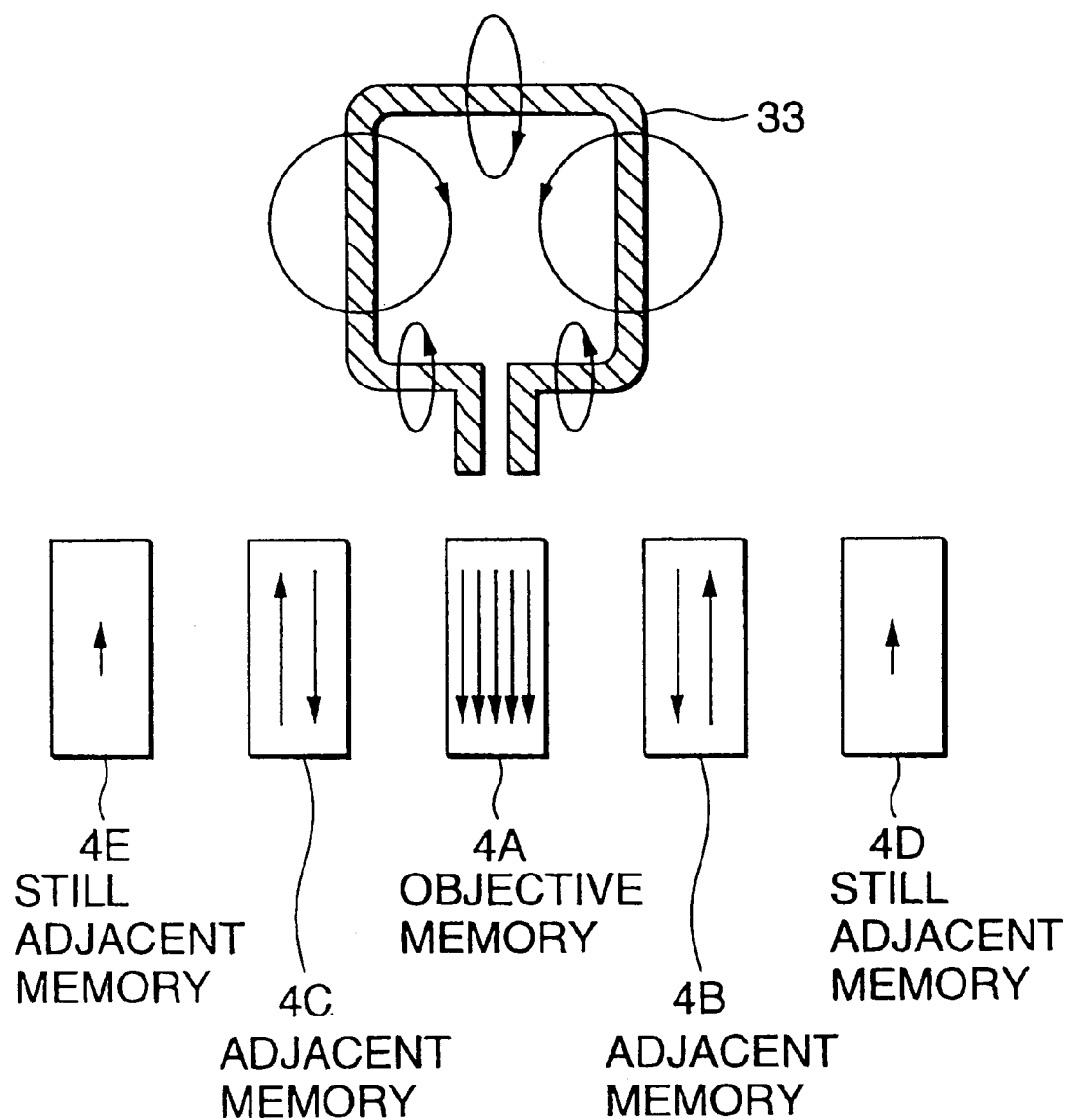
FIG. 21 is an explanatory view of a dead zone of an antenna of the library apparatus according to the mode.

Here, the state of magnetic flux from the antenna 33 is shown by arrows in FIG. 21, and the application state of the magnetic flux to the respective remote memory chips 4A to 4E is schematically shown at the lower part of the drawing.

That is, since the magnetic flux from the antenna 33 is generated like a ring around each part of the antenna, the flux becomes maximum toward the position corresponding to the center of the loop of the antenna 33. As shown in the lower part, this means that the magnetic flux becomes maximum to the objective remote memory chip 4A positioned at the center of the loop.

On the other hand, at the position opposite to both side portions constituting the antenna loop, the magnetic flux energy is cancelled with the ring-like magnetic flux from each of the side portions. That is, when the position of the antenna connected to the remote memory chip 4B or 4C is considered, as shown in the lower part, the magnetic fluxes of the same level are generated in both directions, so that the position becomes one corresponding to the dead zone of the antenna 33.

Besides, since the antenna of the further adjacent remote memory chip 4D or 4E is distant from the antenna 33, the level of the magnetic flux becomes extremely low.

From these, according to the antenna 33 of this embodiment, since the magnetic flux can be applied to only the objective remote memory chip 4A to the utmost, communication with only the remote memory chip 4A can be excellently carried out.

Thus, with respect to each of a number of tape cassettes 1 contained in the magazine 52, control of reading/writing of data can be suitably executed to each remote memory chip 4, and high level management to the tape cassette 1 in the magazine 52 becomes possible.

For the purpose of realizing such proper communication, it becomes necessary to cause the antenna 33 to be correctly positioned at the objective remote memory chip 4A, and this is realized through positioning accuracy of the hand unit 60. If this positioning accuracy is high, it is not difficult to place the adjacent remote memory chips 4B and 4C at the dead zone position of the antenna 33.

At the time of communication, the antenna 33 is made close to the remote memory chip 4A to the utmost, so that power transmission and exchange of data and control signals become possible with small electric power. When the antenna electric power is made small, an amount of power supply to other nearby remote memory chips (4B to 4E, etc.) also becomes small, so that unnecessary transmission from the nearby remote memory chips can also be prevented previously.

However, even if a remote memory chip with high power efficiency exists in the neighborhood and erroneously makes a response, if the authentication processing at the time of communication through the session identifier (code which is given by the library apparatus 50 to each remote memory chip from the serial number and the like) is carried out, the response can be eliminated.

Although the mode of the present invention has been described, the present invention is not limited to the structure and operation described up to here and shown in the respective drawings. The tape cassette, the tape streaming drive, the format and processing operation of data to be stored in the remote memory chip, and the like can be suitably modified according to actual use conditions and the like. Of course, the non-volatile memory in the remote memory chip is not limited to the EEP-ROM.

Moreover, the shape and the size of the antenna 33 of the library apparatus 50 are regulated according to the arrangement interval of the tape cassettes in the magazine 52 so that accurate communication with the remote memory chip 4 can be carried out. However, such technique can be applied to not only the library apparatus but also an apparatus, for example, an apparatus called an auto-loader, in which communication is carried out with a remote memory chip of a specific tape cassette in the state where a number of tape cassettes are adjacently disposed.

Besides, in the mode described so far, although the description has been made on the system comprising the tape cassette for 8 mm VTR with the non-volatile memory in which recording/reproduction of digital signals is carried out, the tape streaming drive corresponding to the tape cassette, and the library apparatus, the present invention is not limited to this. For example, the invention can also be applied to a recording/reproducing system in which information of a video signal and an audio signal can be recorded/reproduced as digital signals.

What is claimed is:

1. A recording medium handling apparatus handling a recording medium comprising memory means in a recording medium case body or on the case body, and communication means for executing data transmission with respect to the memory means in a noncontact manner, comprising:

holding means for holding a plurality of such recording media in a state where said recording media are arranged side by side; and interface means for carrying out data transmission to said memory means in the noncontact manner by executing wireless communication with said communication means through an antenna;

wherein a shape and a size of said antenna are set according to an arrangement interval of said recording media held by said holding means such that when said antenna is placed at a position where said antenna confronts a desired recording medium comprising memory means with which communication is to be executed, among the plurality of recording media held by said holding means so that communication becomes possible, memory means of another recording medium disposed adjacently to said desired recording medium is located at a position corresponding to a dead zone of said antenna.

2. A recording medium handling apparatus according to claim 1, wherein said antenna has a loop shape, and the loop shape is set such that when data transmission is carried out with respect to said memory means of said desired recording medium, communication means of said desired recording medium confronts a loop center portion of said antenna, and communication means of another recording medium adjacent to said desired recording medium confronts an element portion of said antenna.

3. A recording medium handling apparatus according to claim 1, further comprising conveying means for extracting said recording medium from said holding means and conveying it to a desired position, wherein said antenna is attached to said conveying means and is moved in a direction approaching and in a direction going away from said recording medium held by said holding means.

* * * * *